(12) United States Patent
Omote et al.

(10) Patent No.: US 7,926,110 B2
(45) Date of Patent: Apr. 12, 2011

(54) ANTI-WORM-MEASURE PARAMETER DETERMINING APPARATUS, NUMBER-OF-NODES DETERMINING APPARATUS, NUMBER-OF-NODES LIMITING SYSTEM, AND COMPUTER PRODUCT

(75) Inventors: Kazumasa Omote, Kawasaki (JP); Takeshi Shimoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1181 days.

(21) Appl. No.: 11/485,807

(22) Filed: Jul. 13, 2006

(65) Prior Publication Data
US 2007/0220606 A1  Sep. 20, 2007

(30) Foreign Application Priority Data

Mar. 15, 2006 (JP) .................................. 2006-071791

(51) Int. Cl.
*G06F 11/30* (2006.01)
(52) U.S. Cl. ............... 726/24; 726/22; 726/23; 709/223; 709/224
(58) Field of Classification Search ................ 726/24–25
See application file for complete search history.

(56) References Cited

U.S. PATENT DOCUMENTS

| | | | | |
|---|---|---|---|---|
| 6,205,552 B1 * | 3/2001 | Fudge | ............................... | 726/25 |
| 7,434,297 B1 * | 10/2008 | Sutton et al. | ...................... | 26/24 |
| 7,603,715 B2 * | 10/2009 | Costa et al. | ...................... | 726/25 |
| 7,607,021 B2 * | 10/2009 | Rayes et al. | ................... | 713/188 |
| 7,610,367 B2 * | 10/2009 | Canright et al. | ............... | 709/223 |
| 2004/0015712 A1 * | 1/2004 | Szor | ............................... | 713/200 |
| 2004/0236963 A1 * | 11/2004 | Danford et al. | ............... | 713/201 |
| 2005/0050336 A1 * | 3/2005 | Liang et al. | ..................... | 713/188 |
| 2005/0091533 A1 | 4/2005 | Omote et al. | | |
| 2006/0005245 A1 * | 1/2006 | Durham et al. | ................. | 726/25 |
| 2006/0021054 A1 * | 1/2006 | Costa et al. | ...................... | 726/25 |
| 2006/0095970 A1 * | 5/2006 | Rajagopal et al. | ............. | 726/25 |
| 2006/0288415 A1 * | 12/2006 | Wong | .............................. | 726/24 |

FOREIGN PATENT DOCUMENTS

JP    2005-134974    5/2005

OTHER PUBLICATIONS

Moore et al, "Code-Red: a case study on the spread and victims of an Internet worm", 12 pages, 2002.*
Weaver et al, "A Worse-Case Worm", 12 pages, Jun. 8, 2004.*
Zou et al, Worm Propagation Modeling and Analysis under Dynamic Quarantine Defense, 10 pages, 2003.*
Yamada et al, "A New Approach to Early Detection of an Unknown Worm", 5 pages, 2007.*

(Continued)

*Primary Examiner* — Ponnoreay Pich
(74) *Attorney, Agent, or Firm* — Greer, Burns & Crain, Ltd.

(57) ABSTRACT

An anti-worm-measure parameter determining apparatus determines parameters for controlling timing for an anti-worm-measure means to start blocking of a communication by a worm in a network, for preventing a spread of the worm. An infectivity calculating unit calculates infectivity of the worm based on number of nodes connected to the network. A number-of-infected-nodes estimating unit calculates an expected value of number of infected nodes at a time when the worm transmits a predetermined number of packets, based on the infectivity calculated by the infectivity calculating unit.

18 Claims, 15 Drawing Sheets

OTHER PUBLICATIONS

Omote et al, "Timing to Block Scanning Malwares by Using Combinatorics Proliferation Model", 14 pages, 2008.*

Kesidis et al, "Coupled Kermack-McKendrick Models for Randomly Scanning and Bandwidth-Saturating Internet Worms", 9 pages, copyright 2005.*

Extended European Search Report dated Oct. 26, 2010 in European Patent Application No. EP 06253601.6 (9 pages).

Chen, Zesheng, et al., "Importance-Scanning Worm Using Vulnerable-Host Distribution"; IEEE Globecom, 2005; pp. 1779-1784.

Sellke, Sarah, et al., "Modeling and Automated Containment of Worms"; Proceedings of the 2005 International Conference on Dependable Systems and Networks (DSN '05); Jun. 28, 2005; pp. 528-537.

Staniford, Stuart, et al., "Containment of Scanning Worms in Enterprise Networks"; NSDOCID; Oct. 7, 2003; pp. 1-23; retrieved from Internet Oct. 11, 2010.

Weaver, Nicholas, et al., "Very Fast Containment of Scanning Worms"; Jul. 27, 2004; pp. 1-16; www.icsi.berkeley.edu at "Publications" retrieved from Internet Oct. 11, 2010.

* cited by examiner

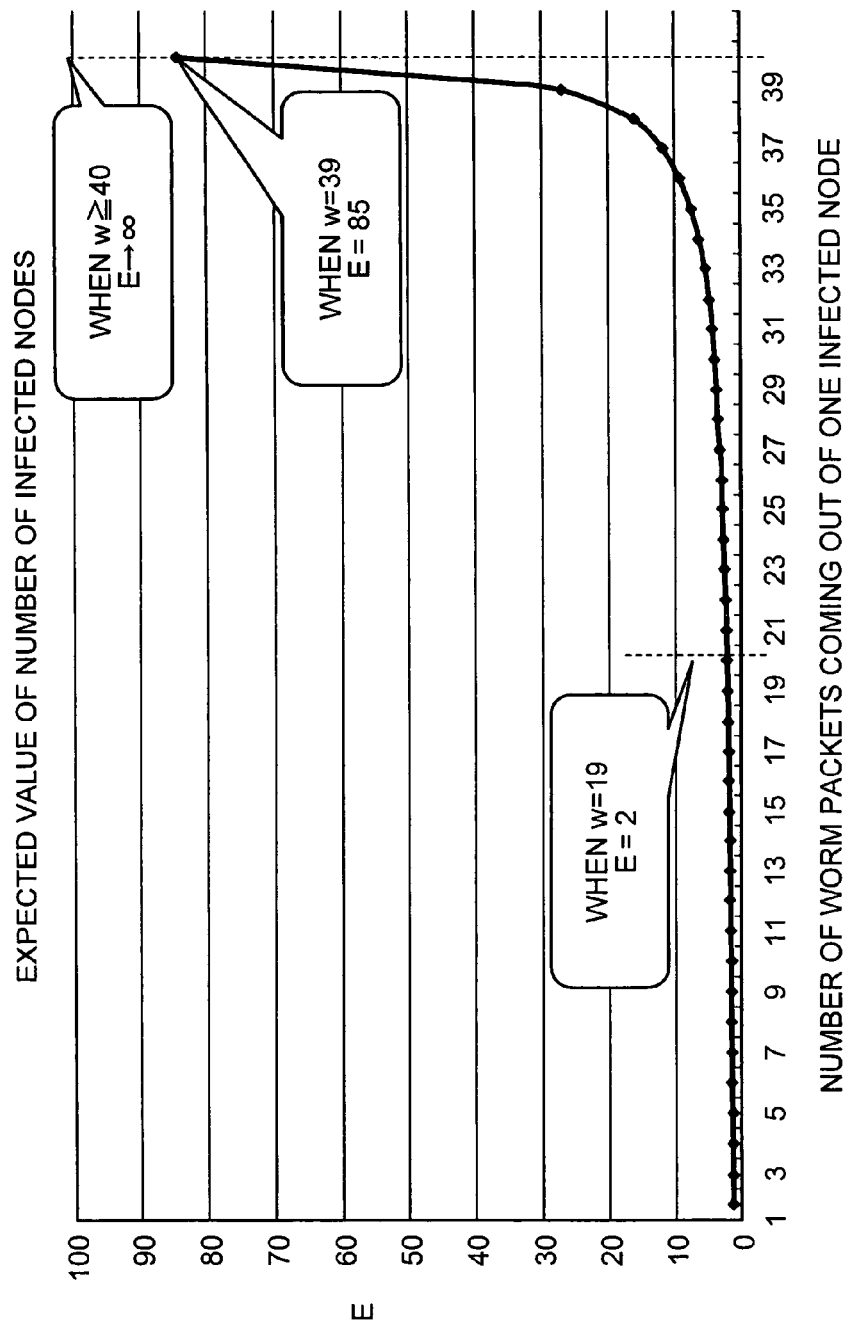

FIG.6

| IDENTIFICATION NAME | SPREADING SPEED (PACKET/msec) | INFECTION-DESTINATION SELECTION ALGORITHM | INFECTION-DESTINATION SELECTION PROBABILITY | | | |
|---|---|---|---|---|---|---|
| | | | P | Pa | Pb | Pc |
| WORM A | 3 | PROBABILISTIC | 0.1 | 0.2 | 0.3 | 0.4 |
| WORM B | 5 | RANDOM | 1.0 | - | - | - |
| ... | ... | ... | ... | ... | ... | ... |

ANTI-WORM-MEASURE PARAMETER DETERMINING APPARATUS, NUMBER-OF-NODES DETERMINING APPARATUS, NUMBER-OF-NODES LIMITING SYSTEM, AND COMPUTER PRODUCT

BACKGROUND OF THE INVENTION

1. Field of the Invention

The present invention relates to a technology for preventing an unknown worm from spreading using an anti-worm-measure means.

2. Description of the Related Art

In recent years, according to the spread of the Internet, damages caused by worms, which are a kind of computer viruses, frequently occur. The worms not only commit illegal acts like destructive acts but also use security holes of an operation system and the like for wrong purposes to hack into other information processing apparatuses connected by a network and repeat autosynthesis. Therefore, the damages caused by the worms tend to rapidly spread in a wide area.

To prevent the expansion of the damages by the worms, it is effective to install an anti-worm-measure program and monitor packets flowing on the network. Since subspecies and new species of the worms often appear in a short period of time, the anti-worm-measure program is created to detect and block unknown worms in addition to the known worms.

Detection of unknown worms is performed by, for example, monitoring fluctuation in a quantity of flow of a specific kind of packets in network traffic (see, for example, Japanese Patent Application Laid-Open No. 2005-134974). However, a certain degree of period is necessary from the time when a certain sign of communication by an unknown worm is detected in certain communication until the time when it is determined that the communication is communication by the worm and the communication is blocked.

If this period is reduced, it is highly likely that normal communication is detected as communication by an unknown worm by mistake. When such misdetection occurs, it is likely that the normal communication is blocked to hinder business and the like. Thus, usually, parameters for determining the period from the time when a sign of communication by an unknown worm is detected until the time when the communication is blocked are set with emphasis put on prevention of the misdetection.

However, when the parameters are set with emphasis put on prevention of the misdetection, the period until the communication is blocked is prolonged and infection of the worm spreads during the period. Therefore, it is necessary to examine the parameters from the viewpoint of prevention of the infection of the worm.

SUMMARY OF THE INVENTION

It is an object of the present invention to at least partially solve the problems in the conventional technology.

A computer-readable recording medium according to one aspect of the present invention stores therein a computer program for determining parameters for controlling timing for an anti-worm-measure means to start blocking of a communication by a worm in a network, for preventing a spread of the worm. The computer program causes a computer to execute calculating infectivity of the worm based on number of nodes connected to the network; and estimating,an expected value of number of infected nodes at a time when the worm transmits a predetermined number of packets, based on the infectivity calculated at the calculating.

An anti-worm-measure parameter determining apparatus according to another aspect of the present invention determines parameters for controlling timing for an anti-worm-measure means to start blocking of a communication by a worm in a network, for preventing a spread of the worm. The anti-worm-measure parameter determining apparatus includes an infectivity calculating unit that calculates infectivity of the worm based on number of nodes connected to the network; and a number-of-infected-nodes estimating unit that estimates an expected value of number of infected nodes at a time when the worm transmits a predetermined number of packets, based on the infectivity calculated by the infectivity calculating unit.

A computer-readable recording medium according to still another aspect of the present invention stores therein a computer program for determining number of nodes connectable to a network when an anti-worm-measure means is set to start blocking of a communication by a worm at predetermined timing, for preventing a spread of the worm. The computer program causes a computer to execute calculating number of packets that can be leaked from packets transmitted from one infection source until the. anti-worm-measure means completes the blocking of the communication by the worm; estimating, based on infectivity of the worm calculated based on the number of nodes connected to the network and the number of packets calculated at the calculating, an expected value of number of nodes infected by the worm until the anti worm-measure means completes the blocking of the communication by the worm; and deriving, as an upper limit of number of nodes connectable to the network, number of nodes at a time when the expected value of the number of infected nodes estimated at the estimating becomes an finite maximum value when it is assumed that some number of packets have been transmitted by the worm.

A number-of-nodes determining apparatus according to still another aspect of the present invention determines number of nodes connectable to a network when an anti-worm-measure means is set to start blocking of a communication by a worm at predetermined timing, for preventing a spread of the worm. The number-of-nodes limiting system includes a limit-value-of-leaked-packets calculating unit that calculates number of packets that can be leaked from packets transmitted from one infection source until the anti-worm-measure means completes the blocking of the communication by the worm; a number-of-infected-nodes estimating unit that estimates, based on infectivity of the worm calculated based on the number of nodes connected to the network and the number of packets calculated by the limit-number-of-leaked-packets calculating unit, an expected value of number of nodes infected by the worm until the anti-worm-measure means completes the blocking of the communication by the worm; and a limit-number-of-nodes deriving unit that derives, as an upper limit of number of nodes connectable to the network, number of nodes at a time when the expected value of the number of infected nodes estimated by the number-of-infected-nodes estimating unit becomes an finite maximum value when it is assumed that some number of packets have been transmitted-by the worm.

A number-of-nodes limiting system according to still another aspect of the present invention limits number of nodes connectable to a network when an anti-worm-measure means is set to start blocking of a communication by a worm at predetermined timing, for preventing a spread of the worm. The number-of-nodes limiting system includes a limit-value-of-leaked-packets calculating unit that calculates number of packets that can be leaked from packets transmitted from one infection source until the anti-worm-measure means completes the blocking of the communication by the worm; a number-of-infected-nodes estimating unit that estimates, based on infectivity of the worm calculated based on the number of nodes connected to the network and the number of packets calculated by the limit-number-of-leaked-packets calculating unit, an expected value of number of nodes infected by the worm until the anti-worm-measure means completes the blocking of the communication by the worm; a limit-number-of-nodes deriving unit that derives, as an upper limit of number of nodes connectable to the network, number of nodes at a time when the expected value of the number of infected nodes estimated by the number-of-infected-nodes estimating unit becomes an finite maximum value when it is assumed that some number of packets have been transmitted by the worm; and a network-address allocating unit that allocates a network address to a node with the upper limit of number of nodes connectable to the network derived by the limit-number-of-nodes deriving unit as a limit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a graph of an example of a relation between the number of worm packets transmitted from one infected node and the number of infected nodes;

FIG. 6 is a table of an example of data structure of worm characteristic information;

DETAILED DESCRIPTION OF THE PREFERRED EMBODIMENTS

Exemplary embodiments of the present invention are explained in detail below with reference to the accompanying drawings.

The anti-worm-measure parameters are the number of worm packets allowed to be leaked in a period from the time when anti-worm-measure means such as an anti-worm-measure program or a firewall program detects a sign of communication by an unknown worm until the time when the anti-worm-measure means determines that the communication is communication by the unknown worm and starts blocking, a time from the time when the anti-worm-measure means detects the sign of the communication of the unknown worm until the time when the anti-worm-measure means completes the blocking, and the like. The worm packet means a packet that the worm transmits for autosynthesis.

In the anti-worm-measure parameter determining method according to a first embodiment of the present invention, an expected value E of the number of infected nodes when infection of a worm spreads from one node as an origin (the node meaning an information processing apparatus connected to a network) is defined as $$E = E(p, T, w) \quad (1)$$

where p is infectivity of the worm, T is time, and w is the number of worm packets transmitted from one infected node. It is possible to calculate the infectivity p of the worm according to the following equation.

$$p = P \times \left(\frac{n-1}{2^{32}}\right) + P_a \times \left(\frac{n_a-1}{2^{24}}\right) + P_b \times \left(\frac{n_b-1}{2^{16}}\right) + P_c \times \left(\frac{n_c-1}{2^{8}}\right) \quad (2\text{-}1)$$

Equation (2-1) is for calculating a probability that, when the worm selects a certain infection destination for autosynthesis, infection actually spreads to the selected destination. In general, a worm selects an IP address of an infection destination with an IP address of a node infected with the worm as a reference to increase infectivity rather than selecting an infection destination at random.

Figure 1A:
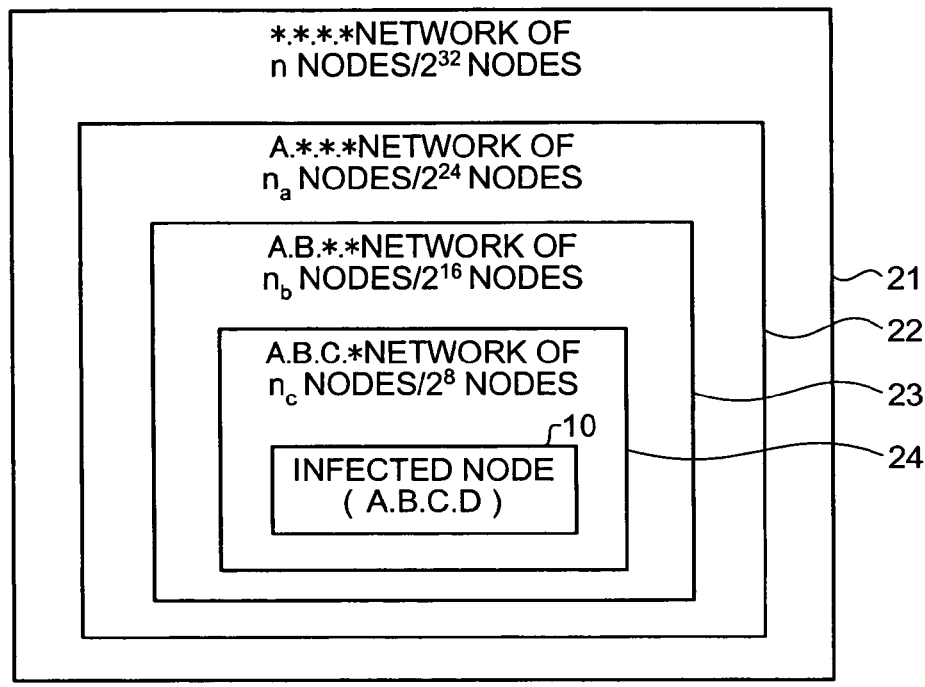
FIGS. 1A and 1B are schematics for explaining infectivity of a worm.

The infectivity of the worm is specifically explained with reference to FIG. 1A. When Internet Protocol (IP) addresses of an infected node 10 is A.B.C.D, in general, the worm selects a node belonging to a network 24 of A.B.C.* (* is an integer of 0 to 255) as an infection destination at a fixed probability, selects a node belonging to a network 23 of A.B.*.* as an infection destination at a fixed probability, selects a node belonging to a network 22 of A.*.*.* as an infection destination at a fixed probability, and selects a node belonging to a network 21 of *.*.*.* as an infection destination at a fixed probability.

The network 24 of A.B.C.* is often a management unit of a sub-network in a company and the like. Therefore, when one of nodes belonging to the network 24 of A.B.C.* is selected to transmit a packet, although it is highly likely that a packet reaches the node selected, an area in which the worm spreads is small. On the other hand, the network 21 of *.*.*.* means an entire IP network. When one of nodes belonging to this network to transmit a packet, although an area in which the worm spreads is large, it is less likely that the packet reaches the node selected. The network 23 of A.B.*.* and the network 22 of A.*.*.*.* have an intermediate characteristic of the characteristics of these networks.

Thus, the worm often selects nodes belonging to the network 24 of A.B.C.*, the network 23 of A.B.*.*, the network 22 of A.*.*.*, and the network 21 of *.*.*.* as infection destinations at fixed probabilities, respectively, to transmits the worm packet.

In Equation (2-1), the probability that the worm selects a node belonging to the network 24 of A.B.C.* as an infection destination is set as $P_c$, the probability that the worm selects a node belonging to the network 23 of A.B.*.* as an infection destination is set as $P_b$, the probability that the worm selects a node belonging to the network 22 of A.*.*.* as an infection destination is set as $P_a$, and the probability that the worm selects a node belonging to the network 21 of *.*.*.* as an infection destination is set as P.

The number of nodes belonging to the network 24 of A.B.C.* is set as $n_c$, the number of nodes belonging to the network 23 of A.B.*.* is set as $n_b$, the number of nodes belonging to the network 22 of A*.*.* is set as $n_a$, and the number of nodes belonging to the network 21 of *.*.*.* is set as n.

It is possible to calculate infectivity p of a worm having strongest infectivity according to the following equation.

$$p = 1.0 \times \left(\frac{n-1}{2^{32}}\right) + 1.0 \times \left(\frac{n_a - 1}{2^{24}}\right) + 1.0 \times \left(\frac{n_b - 1}{2^{16}}\right) + 1.0 \times \left(\frac{n_c - 1}{2^8}\right) \quad (3\text{-}1)$$

Equation (3-1) is for calculating the infectivity, p, assuming that the worm simultaneously selects one node belonging to the network 24 of A.B.C.*, one node belonging to the network 23 of A.B.*.*, one node belonging to the network 22 of A.*.*.*, and one node belonging to the network 21 of *.*.*.* as infection destinations, respectively, and transmits four worm packets thereto.

As the numbers of nodes n, $n_a$, $n_b$, and $n_c$ of the respective networks in Equation (2-1), instead of setting the number of nodes actually connected to the network, the number of nodes excluding nodes for which measures for preventing infection of the worm such as installation of a patch for anti-worm measures and closure of ports used by the worm for infection are taken may be set. Alternatively, the nodes for which the measures are taken may be excluded by multiplying the inputted number of nodes by a ratio of nodes for which the measures are not taken. This is because it is considered that the nodes for which the measures are taken are unlikely to be infected with the worm even if the worm packets reaches.

In the above explanation, it is assumed that the worm selects an infection destination for each of networks with an IP address delimited in octet units. However, a method of delimiting a network is not limited to this. An equation for calculating the infectivity p when a way of delimiting a network is generalized is shown below:

$$p = \sum_{x=1}^{K} P_x \left(\frac{n_x - 1}{N_x}\right)$$

Figure 1B:
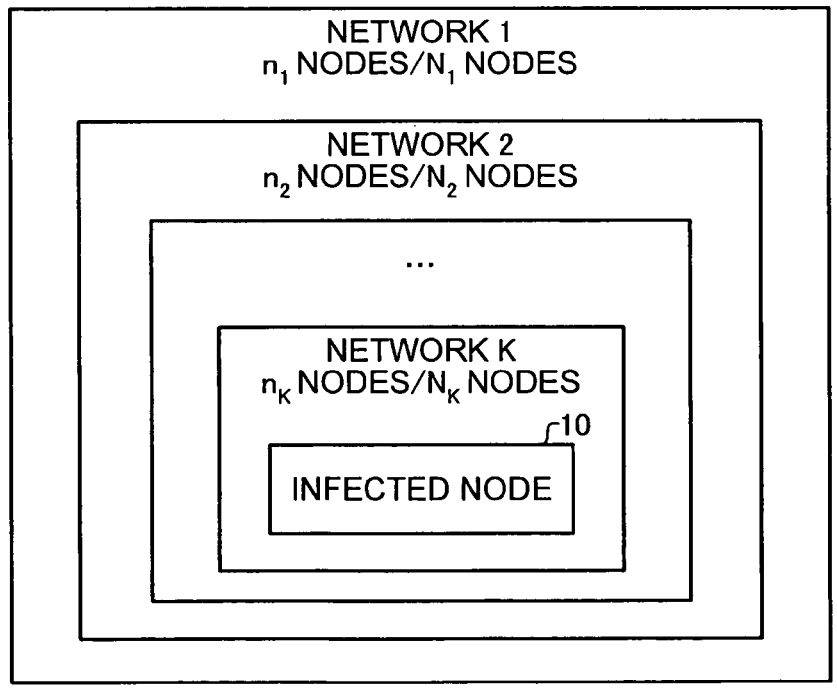

Equation (4-1) is for calculating the infectivity p of a worm infecting the infected node 10 included in a network K, wherein a network is delimited to a network 1 to the network K as shown in FIG. 1B such that a network X includes a network (X+1).

In Equation (4-1), $n_x$ indicates the number of nodes connected to the network X, $N_x$ indicates a maximum value of the number of nodes connectable to the network X, and $P_x$ indicates a probability that the worm selects a node connected to the network X as an infection destination. In the following explanation, for simplification of explanation, it is assumed that the worm selects an infection destination for each of networks with an IP address delimited in octet units.

It is possible to more specifically express E(p,T,w) in Equation 1 using various formula models such as a discrete mathematics model, a continuous mathematics model, and a probability model. An example of E(p,T,w) expressed again using the discrete mathematics model is shown as $$E(p, T, w) = \sum_{i=1}^{T} E_i(p, T, w) + 1 \quad (5)$$

Equation (5) expresses an expected value of the number of infected nodes considering that infection of the worm spreads according to n-th order infection (n is a positive integer) from one infection source. The worm has a characteristic that an infection source of the worm is not limited to one infection node but a newly infected node also becomes an infection source to spread infection to other nodes. The characteristic is taken into account in this equation. In this equation, i means i-th order infection and a unit of the time T is a period required for the worm to infect from a certain node to the other nodes.

An expected value $E_1(p,T,w)$ of the number of infected nodes taking only primary infection into account is expressed by the following equation.

$$E_1(p, T, w) = \begin{cases} \sum_{i=1}^{T} i \cdot {}_T C_i \cdot p^i \cdot (1-p)^{T-i} & (T < w) \\ \sum_{i=1}^{w} i \cdot {}_w C_i \cdot p^i \cdot (1-p)^{w-i} & (T \geq w) \end{cases} \quad (6)$$

As it is evident from Equation (6), when T is larger than w, the number of infected nodes is derived depending on w and without depending on T. Thus, when T is set sufficiently large, it is possible to express Equation (5) as $$E(p, T, w) = \sum_{i=1}^{T} E_1(p, w, w)^i + 1 \quad (7)$$

A graph representing a relation between the number of worm packets w of worm packets transmitted from one infected node and the expected value E of the number of infected nodes at the time when the infectivity p is set to 0.02534 and the time T is set sufficiently large is shown in FIG. 2. The expected value E of the number of infected nodes indicated in the equation is an expected value calculated by using Equation 7.

As shown in the figure, when w=19, the expected value E of the number of infected nodes is 2. This means that, if blocking of communication by the worm is completed at a stage when nineteen worm packets are transmitted from an infected node, it is possible to limit the number of nodes infected with the worm with the infected node as an origin to one.

When w=39, the expected value E of the number of infected nodes is 85. When w is equal to or larger than 40, the expected value E of the number of infected nodes diverges. This means that 39 is a limit number of leaked packets, that is, the number of worm packets allowed to be leaked until the anti-worm-measure means completes blocking of communication by an unknown worm and, if the blocking of the communication by the worm is completed at a stage when thirty-nine worm packets are transmitted from an infected node, it is possible to prevent the worm from spreading with the infected node as an origin.

In this way, it is possible to derive the limit number of leaked packets by setting the time T sufficiently large, calculating the expected value E of the number of infected nodes while sequentially incrementing w from 1 using Equation 7 or the like, and acquiring a value of w immediately before the expected value E of the number of infected nodes changes to ∞. In an actual operation, to surely prevent the spread of the worm, it is preferable to use a value obtained by subtracting a predetermined number of packets, which is calculated by taking into a standard deviation or the like, from the limit number of leaked packets acquired in this way as a limit number of leaked packets.

If anti-worm-measure means are installed in all the nodes connected to the networks and the respective anti-worm-measure means set-anti-worm-measure parameters to allow leakage of worm packets with a limit set at the limit number of leaked packets in the respective networks, it is possible to prevent spread of the worm to the entire networks.

Figure 3A:
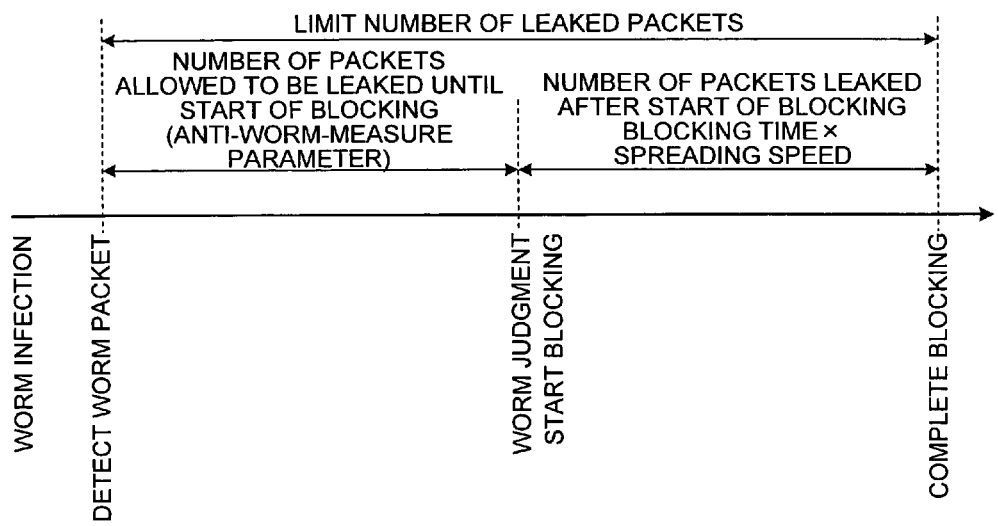
FIGS. 3A and 3B are schematics for explaining a method of calculating anti-worm-measure parameters.

When the limit number of leaked packets is derived as described above, it is possible to easily calculate anti-worm-measure parameters. FIG. 3A is a diagram of an example in which an anti-worm-measure parameter is calculated as the number of packets allowed to be leaked until start f blocking.

As shown in the figure, even if the anti-worm-measure means determines that specific communication is communication by a worm and starts blocking of the communication, there is a slight time lag until the blocking is completed. It is possible to calculate the number of worm packets transmitted from one infection source and leaked in this period by multiplying length of this period (hereinafter, "blocking time") by the number of worm packets that the worm transmits in a fixed time (hereinafter, "spreading speed").

It is possible to calculate the number of packets allowed to be leaked until start of the blocking by subtracting this number of worm packets from the limit number of leaked packets. This value is the number of packets, which are the same as a packet considered to be transmitted in communication by an unknown worm, to be allowed to be leaked from an identical transmission source from the time when the anti-worm-measure means detects the packet considered to be transmitted in communication by the unknown worm until the time when the anti-worm-measure means determines that the communication is communication by the unknown worm to start blocking of the communication.

Figure 3B:
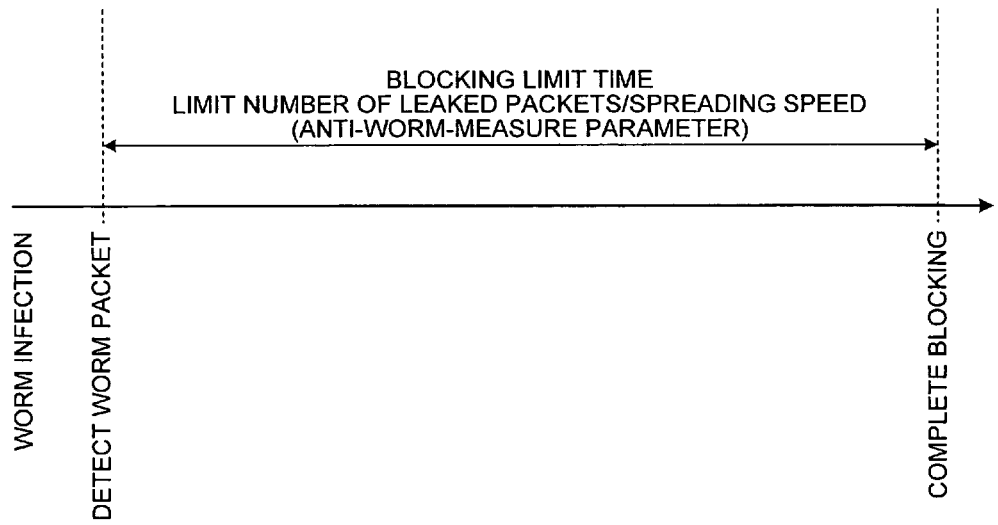

It is also possible to calculate anti-worm-measure parameters with time as a reference. FIG. 3B is a diagram of an example in which the anti-worm-measure parameter is calculated as a blocking limit time, that is, a time from the time when the anti-worm-measure means detects a packet considered to be transmitted in communication by an unknown worm until the time when the anti-worm-measure means completes blocking. As shown in the figure, it is possible to calculate the blocking limit time by dividing the limit number of leaked packets by spreading speed.

Figure 4:
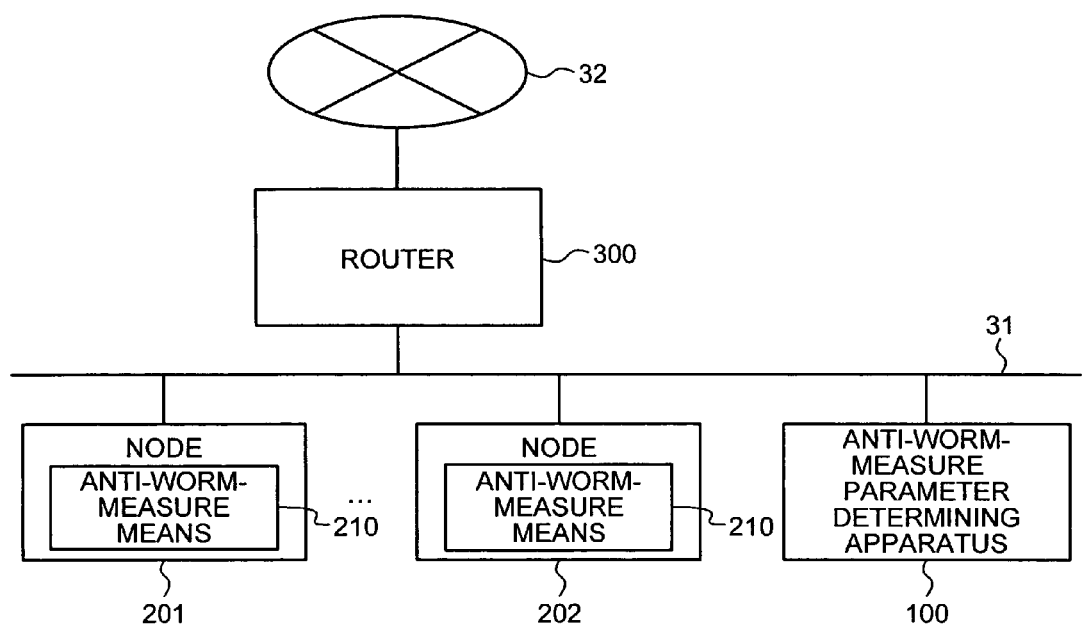
FIG. 4 is a schematic of an example of arranging an anti-worm-measure parameter determining apparatus according to a first embodiment of the present invention.

FIG. 4 is a schematic of an example of arranging an anti-worm-measure parameter determining apparatus 100 according to a first embodiment of the present invention.

The anti-worm-measure parameter determining apparatus 100 shown in the figure determines anti-worm-measure parameters using the anti-worm-measure parameter determining method explained already. The anti-worm-measure parameter determining apparatus 100 is connected to a network 31. Nodes 201 to 202 and a router 300 for connecting the network 31 to a network 32 are also connected to the network 31.

Anti-worm-measure means 210 such as an anti-worm-measure program or a firewall program, which is means for preventing infection of worms from other nodes to the own nodes and infection of worms from the own nodes to the other nodes, is installed in the nodes 201 to 202. According to the first embodiment, it is assumed that the anti-worm-measure means 210 are installed in all the nodes connected to the networks in the same manner. The anti-worm-measure parameter determining apparatus 100 is used for determining parameters for the anti-worm-measure means 210 to detect and block the worms.

The anti-worm-measure parameter determining apparatus 100 does not always have to be connected to the network 31. The anti-worm-measure parameter determining apparatus 100 may determine anti-worm-measure parameters off line. It is also possible to install the anti-worm-measure parameter determining apparatus 100 or a program having the same function as the anti-worm-measure parameter determining apparatus 100 in the nodes 201 to 202 and the router 300.

Figure 5:
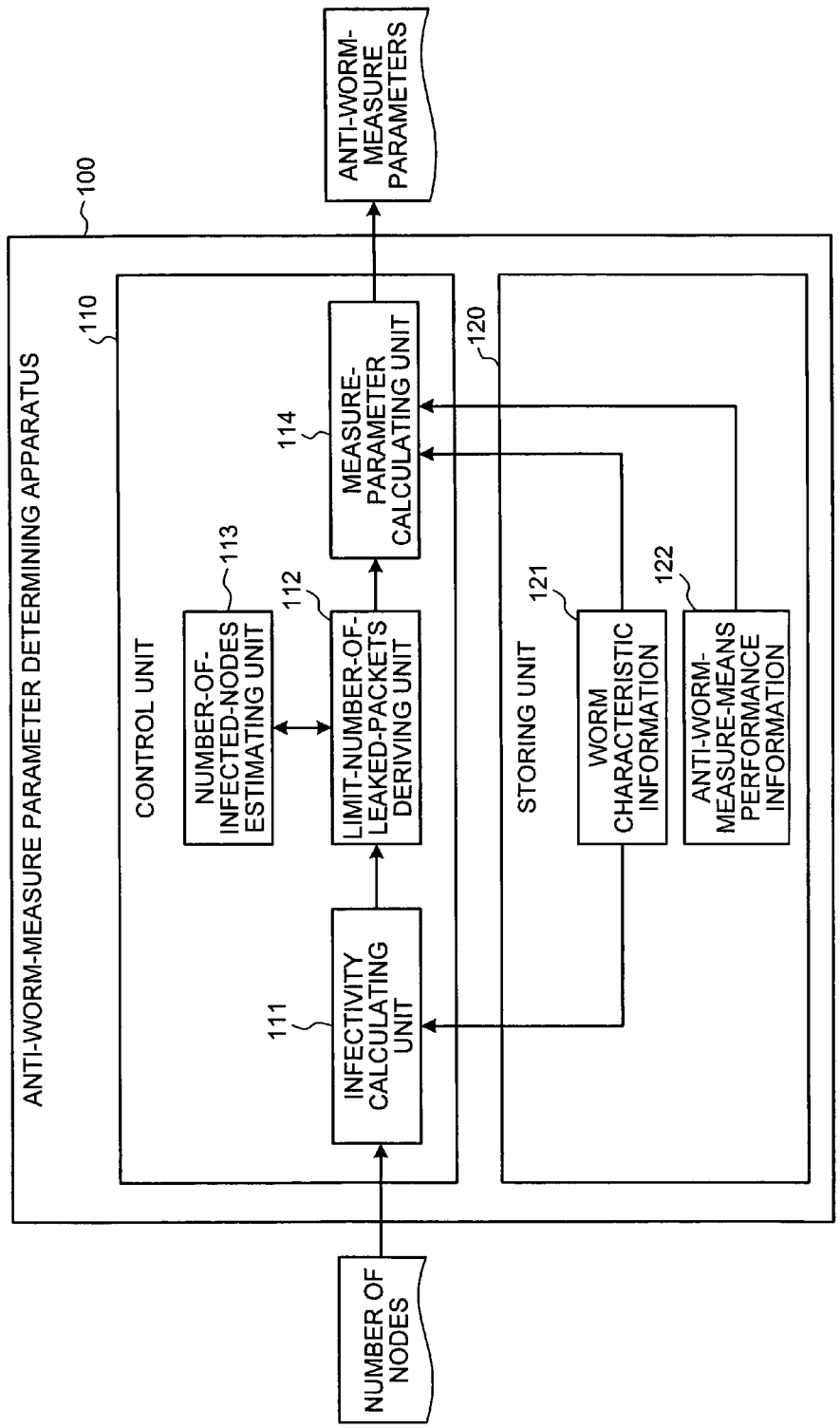
FIG. 5 is a block diagram of the anti-worm-measure parameter determining apparatus according to the first embodiment.

FIG. 5 is a block diagram of the anti-worm-measure parameter determining apparatus 100 according to the first embodiment. As shown in the figure, the anti-worm-measure parameter determining apparatus 100 is an apparatus with the number of nodes as an input and anti-worm-measure parameters as an output. The anti-worm-measure parameter determining apparatus 100 includes a control unit 110 and a storing unit 120.

The control unit 110 controls the anti-worm-measure parameter determining apparatus 100. The control unit 110 includes an infectivity calculating unit 111, a limit-number-of-leaked-packets deriving unit 112, a number-of-infected-nodes estimating unit 113, and a measure-parameter calculating unit 114.

The infectivity calculating unit 111 calculates the infectivity p using Equation (2-1). The infectivity calculating unit 111 acquires infection-destination-selection probabilities P, $P_a$, $P_b$, and $P_c$ necessary for calculation of the infectivity p from worm characteristic information 121 of the storing unit 120 and applies the number of nodes inputted as numbers of nodes n, $n_a$, $n_b$, and $n_c$.

FIG. 6 is a table of an example of data structure of the worm characteristic information. As shown in the figure, an identification name, spreading speed, an infection-destination-selection algorithm, and the infection-destination-selection probabilities P, $P_a$, $P_b$, and $P_c$ are registered in advance for each of types of worms. The identification name is an identification name indicating a type of a worm. The spreading speed represents the number of worm packets that the worm transmits in a fixed time.

The infection-destination-selection algorithm takes a value of "probabilistic" or "random". When the infection-destination-selection algorithm is "probabilistic", this means that the worm is a worm that selects, as described already, nodes belonging to the network 24 of A.B.C.*, the network 23 of A.B.*.*, the network 22 of A.*.*.*, and the network 21 of *.*.*.* as infection destinations at fixed probabilities, respectively.

When the infection-destination-selection algorithm is "random", this means that the worm is a worm that selects an infection destination regardless of an IP address of a node infected with the worm. When the infection-destination-selection algorithm is "random", only P is set as the infection-destination-selection probability.

The infection-destination-selection probabilities P, $P_a$, $P_b$, and $P_c$ represent probabilities that the worm selects a node belonging to the network 21 of *.*.*.*, a node belonging to the network 22 of A.*.*.*, a node belonging to the network 23 of A.B.*.*, and a node belonging to the network 24 of A.B.C.* as infection destinations, respectively.

The infectivity calculating unit 111 estimates an infection-destination-selection probability of an unknown worm from information stored in the worm characteristic information 121 to calculate infectivity of the unknown worm. This estimation is performed by, for example, calculating a maximum value, a minimum value, or an average for each of P, $P_a$, $P_b$, and $P_c$. It is also possible to assume that all P, $P_a$, $P_b$, and $P_c$ are 1.0.

The numbers of nodes n, $n_a$, $n_b$, and $n_c$ that the infectivity calculating unit 11 uses to calculate infectivity of an unknown worm, that is, the numbers of nodes belonging to the network 21 of *.*.*.*, the network 22 of A.*.*.*, the network 23 of A.B.*.*, and the network 24 of A.B.C.* may be inputted by a not-shown inputting unit such as a keyboard. The numbers of nodes may be inputted through the network or may be stored in the storing unit 120 in advance.

Alternatively, the infectivity calculating unit 111 or a dedicated processing unit may inquire a system management apparatus or the like, which manages a constitution of the network, about the number of nodes and acquire the number of nodes; The infectivity calculating unit 11 or the dedicated processing unit itself may count the number of nodes connected to the network using PING or the like The limit-number-of-leaked-packets deriving unit 112 causes the number-of-infected-nodes estimating unit 113 to calculate the expected value E of the number of infected nodes and derives a limit number of leaked packets. The number-of-infected-nodes estimating unit 113 applies a value designated by the limit-number-of-leaked packets deriving unit 112 to Equation 7 to calculate the expected value E of the number of infected nodes.

Specifically, the limit-number-of-leaked-packets deriving unit 112 designates two values and causes the number-of-infected-nodes estimating unit 113 to calculate the expected value E of the number of infected nodes. One of the values is the infectivity p calculated by the infectivity calculating unit 111 and another is the number of worm packets w of worm packets transmitted from one infected node.

The limit-number-of-leaked-packets deriving unit 112 causes the number-of-infected-nodes estimating unit 113 to calculate the expected value E of the number of infected nodes while sequentially incrementing w by one and sets a value of w immediately before the expected value E changes to ∞ as the limit number of leaked packets.

The measure-parameter calculating unit 114 calculates necessary anti-worm-measure parameters based on the limit number of leaked packets derived by the limit-number-of-leaked-packets deriving unit 112 and outputs the anti-worm-measure parameters. Specifically, the measure-parameter calculating unit 114 calculates the number of packets allowed to be leaked until the start of the blocking shown in FIG. 3A, the blocking limit time shown in FIG. 3B, and the like.

If spreading speed of a worm is necessary to calculate anti-worm-measure parameters, the measure-parameter calculating unit 114 acquires information on the spreading speed from the worm characteristic information 121 of the storing unit 120. If a blocking time of the anti-worm-measure means is necessary, the measure-parameter calculating unit 114 acquires information on the blocking time from anti-worm-measure-means performance information 122 of the storing unit 120.

The storing unit 120 stores various kinds of information. The storing unit 120 stores the worm characteristic information 121 and the anti-worm-measure-means performance information 122. The worm characteristic information 121 is, as explained already, information in which characteristics of various worms are registered in advance. The anti-worm-measure-means performance information 122 is information in which information on performance of various anti-worm-measure means such as a blocking time is registered in advance.

Figure 7:
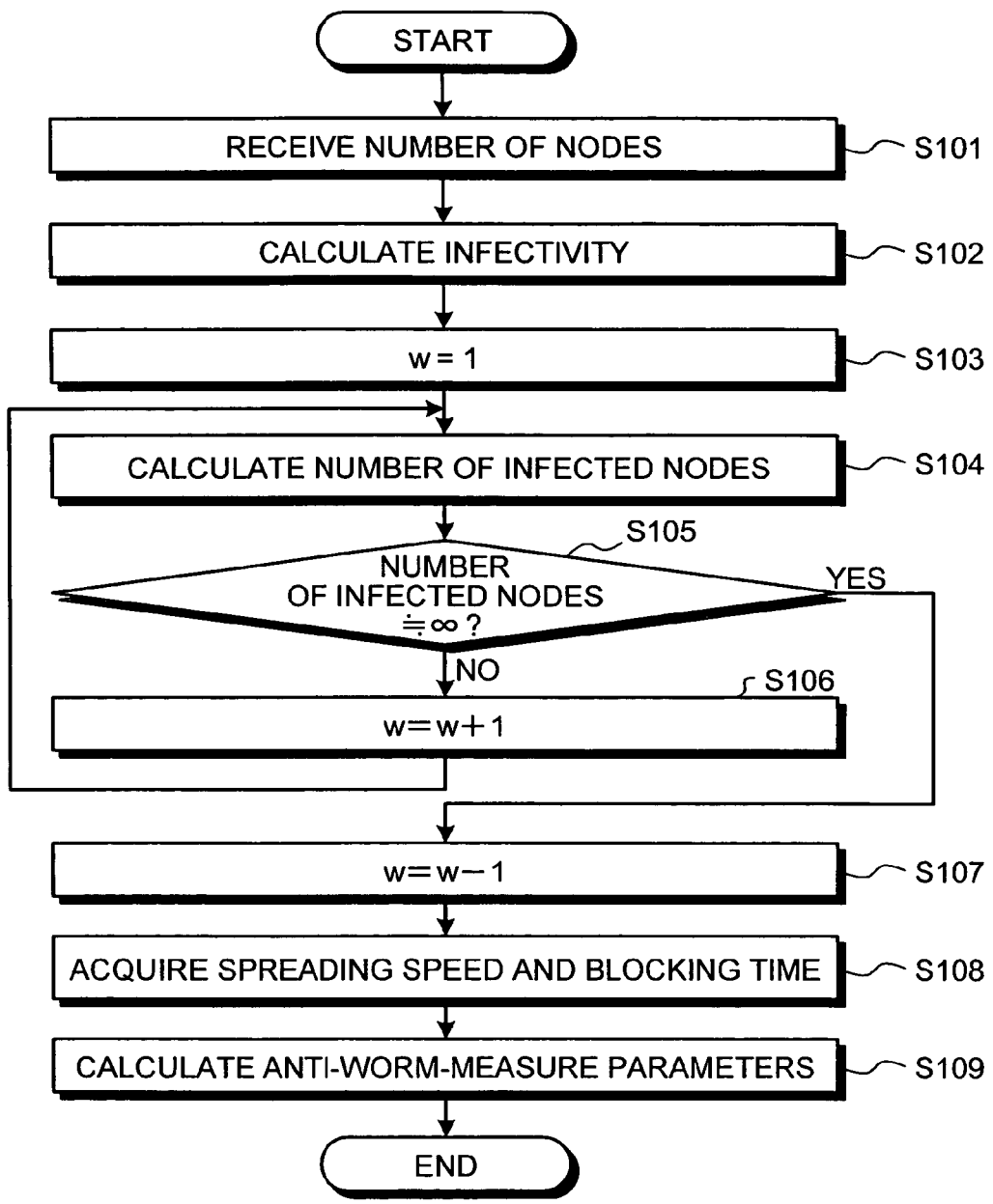
FIG. 7 is a flowchart of a processing procedure of the anti-worm-measure parameter determining apparatus according to the first embodiment.

FIG. 7 is a flowchart of a processing procedure of the anti-worm-measure parameter determining apparatus 100 according to the first embodiment.

As shown in the figure, the anti-worm-measure parameter determining apparatus 100 receives an input of the number of nodes of a network for which anti-worm-measure parameters are determined (step S101). The infectivity calculating unit 111 calculates the infectivity p based on the number of nodes inputted (step S102).

Subsequently, the limit-number-of-leaked packets deriving unit 112 initializes the number of worm packets w transmitted from one infected node to 1 (step S103). The limit-number-of-leaked packets deriving unit 112 designates p and w and causes the number-of-infected-nodes estimating unit 113 to calculate the expected value E of the number of infected nodes for T being sufficiently large (step S104). If the expected value E of the number of infected nodes is not ∞ ("No" at step S105), the limit-number-of-leaked-packets deriving unit 112 adds 1 to w (step S106), returns to step S104, and causes the number-of-infected-nodes estimating unit 113 to calculate the expected value E of the number of infected nodes.

If the expected value E of the number of infected nodes is ∞ ("Yes" at step S105), the limit-number-of-leaked-packets deriving unit 112 sets a value obtained by subtracting 1 from w as the limit number of leaked packets (step S107). The measure-parameter calculating unit 114 acquires spreading speed of a worm and a blocking time of the anti-worm-measure means from the storing unit 120 (step S108) and calculates anti-worm-measure parameters based on these values and the limit number of leaked packets calculated by the limit-number-of-leaked-packets deriving unit 112 (step S109).

It is also possible to realize the functions of the anti-worm-measure parameter determining apparatus 100 by executing an anti-worm-measure parameter determining program prepared in advance with a computer.

Figure 8:
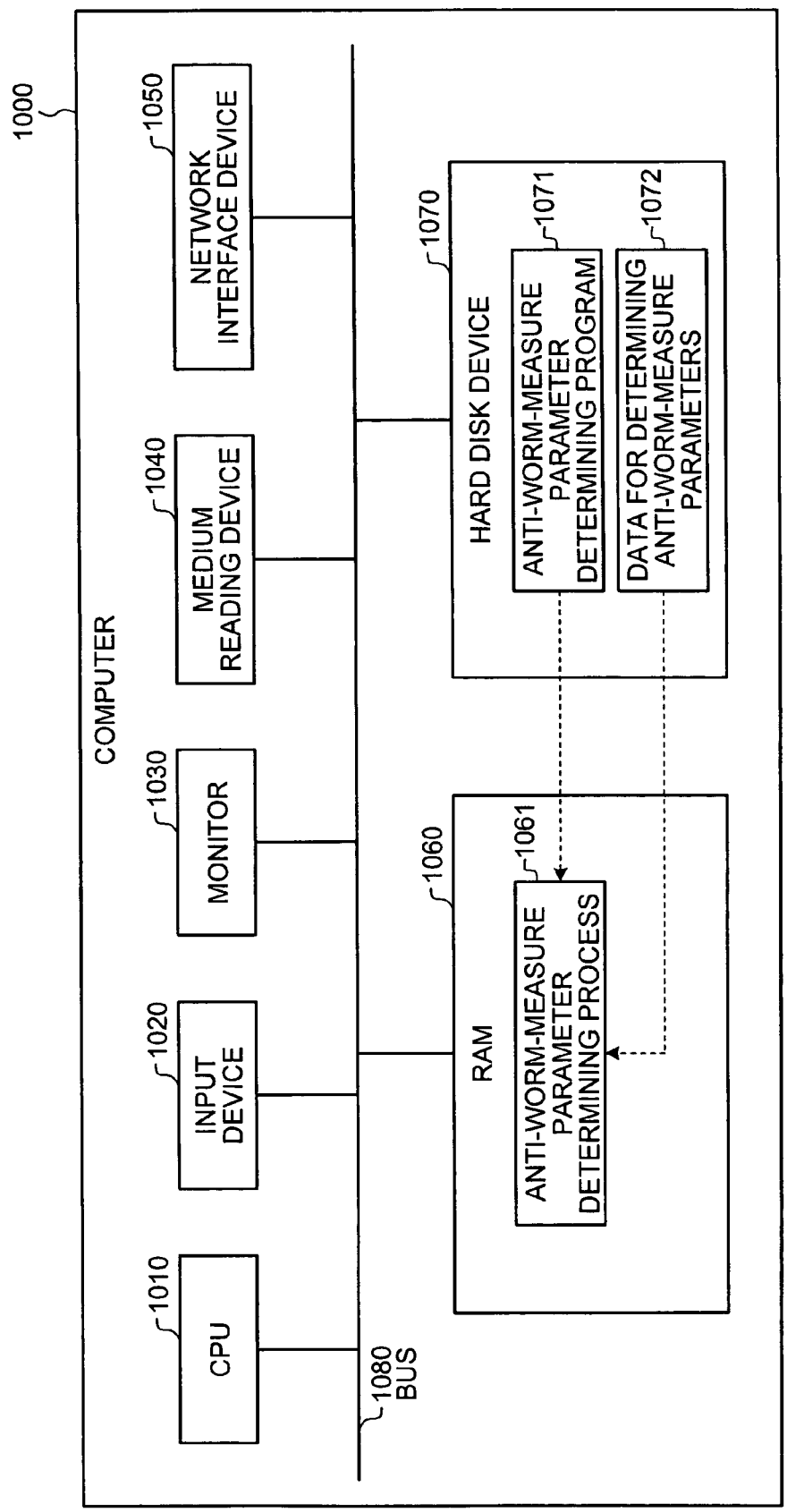
FIG. 8 is a block diagram of a computer that executes an anti-worm-measure parameter determining program according to the first embodiment.

FIG. 8 is a block diagram of a computer 1000 that executes an anti-worm-measure parameter determining program 1071 according to the first embodiment. The computer 1000 is constituted by connecting, via a bus 1080, a central processing unit (CPU) 1010 that executes various kinds of arithmetic processing, an input device 1020 that receives an input of data from a user, a monitor 1030 that displays various kinds of information, a medium reading device 1040 that reads a program and the like from a recording medium having various programs and the like recorded therein, a network interface device 1050 that performs exchange of data between the computer 1000 and other computers, a random access memory (RAM) 1060 that temporarily stores various kinds of information, and a hard disk device 1070.

The anti-worm-measure parameter determining program 1071 having the same functions as the control unit 110 shown in FIG. 5 and data for determining anti-worm-measure parameters 1072 corresponding to the various data stored in the storing unit 120 shown in FIG. 5 are stored in the hard disk device 1070. It is also possible to appropriately disperse and store the data for determining anti-worm-measure parameters 1072 in the other computers connected via the network.

The CPU 1010 reads out the anti-worm-measure parameter determining program 1071 from the hard disk device 1070 and expands the program in the RAM 1060. Consequently, the anti-worm-measure parameter determining program 1071 functions as an anti-worm-measure parameter determining process 1061. The anti-worm-measure parameter determining process 1061 appropriately expands the information and the like read out from the data for determining anti-worm-measure parameters 1072 in an area allocated to the process on the RAM 1060. The anti-worm-measure parameter determining process 1061 executes various kinds of data processing based on the data and the like expanded.

The anti-worm-measure parameter determining program 1071 does not always have to be stored in the hard disk device 1070. The computer 1000 may read out and execute this program stored in a storing medium such as a CD-ROM. It is also possible that this program is stored in other computers (or servers) and the like connected to the computer 1000 via a public line, the Internet, a local area network (LAN), a wide area network (WAN), and the like and the computer 1000 reads out and executes the program from the other computers (or servers) and the like.

As described above, according to the first embodiment, it is calculated, when a worm spreads, how many nodes are connected to the network and how many packets the worm transmits. The anti-worm-measure means sets the number of packets allowed to be leaked. Thus, it is possible to set parameters for anti-worm measures to prevent the worm from being spread.

According to a second embodiment of the present invention, an example in which anti-worm-measure parameters are calculated on the premise that the anti-worm-measure means are installed in the respective nodes is explained. However, the anti-worm-measure means may be installed in a transmission apparatus such as a router. The anti-worm-measure parameter determining apparatus 100 according to the first embodiment can calculate anti-worm-measure parameters for the anti-worm-measure means installed in the transmission apparatus such as a router.

Thus, according to the second embodiment, the anti-worm-measure parameter determining method and operations of the anti-worm-measure parameter determining apparatus 100 are explained with reference to an example in which anti-worm measures are installed in a router.

Figure 9:
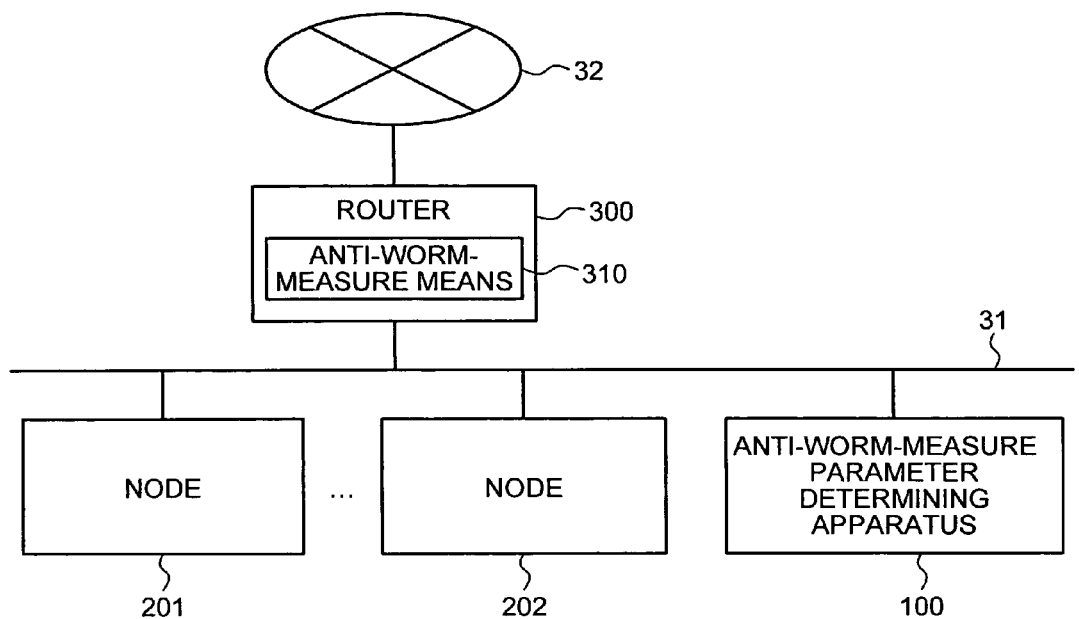
FIG. 9 is a schematic of an example of arranging an anti-worm-measure parameter determining apparatus according to a second embodiment of the present invention.

FIG. 9 is a schematic of an example of arranging the anti-worm-measure parameter determining apparatus 100 according to the second embodiment.

As shown in the figure, the anti-worm-measure parameter determining apparatus 100 is connected to the network 31. A router for connecting the nodes 201 to 202 and the network 31 to the network 32 and the like is also connected to the network 31.

An anti-worm-measure means 310 such as an anti-worm-measure program or a firewall program is installed in the nodes 201 to 202 to prevent infection of worms between networks. According to the second embodiment, it is assumed that the anti-worm-measure means 310 are installed in all the routers connected to the networks. The anti-worm-measure parameter determining apparatus 100 is used for determining parameters for the anti-worm-measure means 310 to detect and block the worms.

The anti-worm-measure parameter determining apparatus 100 does not always have to be connected to the network 31. The anti-worm-measure parameter determining apparatus 100 may determine anti-worm-measure parameters off line. It is also possible to install the anti-worm-measure parameter determining apparatus 100 or a program having the same function as the anti-worm-measure parameter determining apparatus 100 in the nodes 201 to 202 and the router 300.

The infectivity p of a worm is explained. As shown in FIG. 9, when the anti-worm-measure means 310 is installed in the router 300, the anti-worm-measure means 310 functions to prevent infection of the worm between the networks. For example, when the worm is infected from the node 201 to the node 202, the anti-worm-measure means 310 does not function to prevent infection of the worm from spreading in a network subordinate to the router 300.

Therefore, when anti-worm-measure parameters for the anti-worm-measure means 310 are determined, it is necessary to exclude nodes belonging to the network subordinate to the router 300 and calculate the infectivity p.

Figure 10:
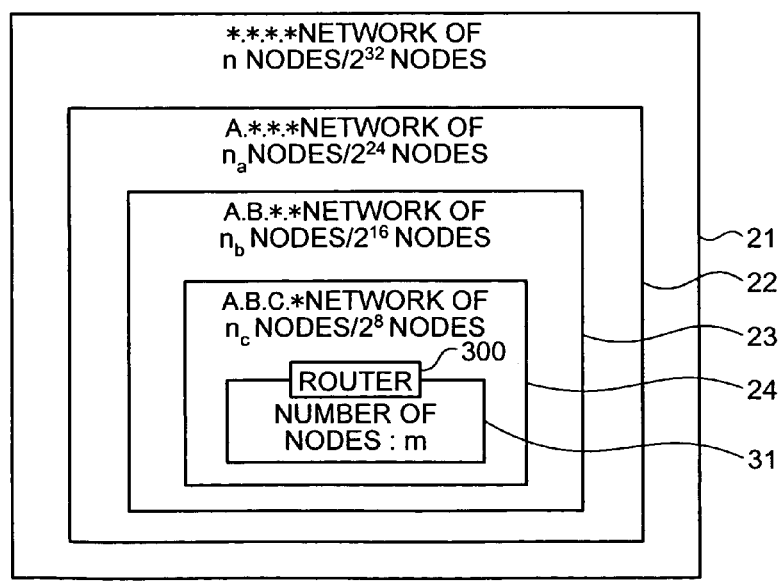
FIG. 10 is a schematic for explaining infectivity of a worm.

An equation for calculating the infectivity p is shown below when a worm selects an infection destination for each of networks with an IP address delimited in octet units at a fixed probability and the network 31 subordinate to the router 300 is included in the network 31 of A.B.C.* as shown in FIG. 10.

$$p = P \times \left(\frac{n-m}{2^{32}}\right) + P_a \times \left(\frac{n_a - m}{2^{24}}\right) + P_b \times \left(\frac{n_b - m}{2^{16}}\right) + P_c \times \left(\frac{n_c - m}{2^{8}}\right) \quad (2\text{-}2)$$

Equation (2-2) calculates a probability that, when a worm infecting any one of nodes belonging to the network 31 subordinate to the router 300 selects a certain infection destination for autosynthesis, infection spreads to other networks beyond the router 300.

In Equation (2-2), P, $P_a$, $P_b$, and $P_c$ are a probability that the worm selects a node belonging to the network 21 of *.*.*.* as an infection destination, a probability that the worm selects a node belonging to the network 22 of A.*.*.* as an infection destination, a probability that the worm selects a node belonging to the network 23 of A.B.*.* as an infection destination, and a probability that the worm selects a node belonging to the network 24 of A.B.C.* as an infection destination, respectively.

In Equation (2-2), n, $n_a$, $n_b$, and $n_c$ are the, number of nodes belonging to the network 21 of *.*.*.*, the number of nodes belonging to the network 22 of A.*.*.*, the number of nodes belonging to the network 23 of A.B.*.*, and the number of nodes belonging to the network 24 of A.B.C.*. Further, m is the number of nodes belonging to the network 31 subordinate to the router 300.

It is possible to calculate the infectivity p of a worm having strongest infectivity according to the following equation.

$$p = 1.0 \times \left(\frac{n-m}{2^{32}}\right) + 1.0 \times \left(\frac{n_a - m}{2^{24}}\right) + 1.0 \times \left(\frac{n_b - m}{2^{16}}\right) + 1.0 \times \left(\frac{n_c - m}{2^{8}}\right) \quad (3\text{-}2)$$

Equation (3-2) is for calculating the infectivity p, assuming that the worm simultaneously selects one node belonging to the network 24 of A.B.C.*, one node belonging to the network 23 of A.B.*.*, one node belonging to the network 22 of A.*.*.*, and one node belonging to the network 21 of *.*.*.* as infection destinations, respectively, and transmits four worm packets thereto.

As the numbers of nodes n, $n_a$, $n_b$, and $n_c$ of the respective networks in Equation (2-2), instead of setting the number of nodes actually connected to the network, the number of nodes excluding nodes for which measures for preventing infection of the worm such as installation of a patch for anti-worm measures and closure of ports used by the worm for infection are taken may be set. Alternatively, the nodes for which the measures are taken may be excluded by multiplying the inputted number of nodes by a ratio of nodes for which the measures are not taken.

In the above explanation, it is assumed that the worm selects an infection destination for each of the networks with an IP address delimited in octet units. However, a method of delimiting a network is not limited to this. An equation for calculating the infectivity p when a way of delimiting a network is generalized is shown below:

$$p = \sum_{x=1}^{K} P_x \left( \frac{n_x - m}{N_x} \right) \quad (4\text{-}2)$$

Equation (4-2) is for calculating the infectivity p of a worm at the time when a network is delimited to a network 1 to the network K such that a network X includes a network (X+1). It is assumed that the network K includes a router and a network subordinate to the router.

In the equation, $n_x$ indicates the number of nodes connected to the network X, $N_x$ indicates a maximum value of the number of nodes connectable to the network X, $P_x$ indicates a probability that the worm selects a node connected to the network X as an infection destination, and m indicates the number of nodes connected to the network subordinate to the router.

Figure 11:
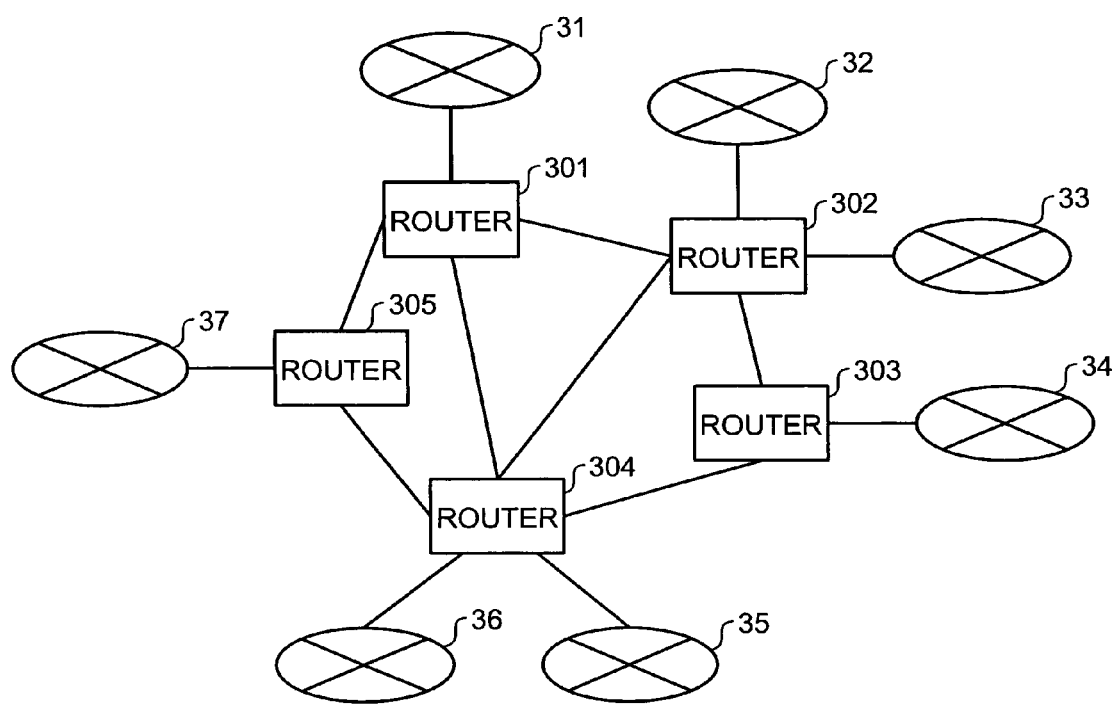
FIG. 11 is a schematic of an example of a company network.

A limit number of leaked packets w is explained. For example, it is assumed that a structure of an entire network in a company is as shown in FIG. 11. In the example shown in the figure, five routers 301 to 305 are connected in mesh.

The network 31 is present subordinately under the router 301, the networks 31 and 32 are present under the router 302, a network 34 is present under the router 303, networks 35 and 36 are present under the router 304, and a network 37 is present under the router 305.

In the network 31, it is assumed that the anti-worm-measure means are installed in the routers 301 to 305, respectively, and the anti-worm-measure means are not installed in separate nodes belonging to the networks 31 to 37. In this case, when a worm infects from a node belonging to the network 31 to one of nodes belonging to the network 37, infection of the worm spreads to all the nodes belonging to the network 37.

In an environment in which the anti-worm-measure means is installed only in the routers connecting the networks in this way, at least one node belonging to a network subordinate to a certain router is infected with a worm, the worm spreads to networks subordinate to the router.

Therefore, to prevent the worm from spreading to the entire network with the node belonging to the network subordinate to the certain router as an origin, it is necessary to set a value of w immediately before the expected value E of the number of infected nodes exceeds the number of networks excluding the network as a limit number of leaked packets.

Except that the method of calculating the infectivity p and the method of calculating the limit number of leaked packets w are different, even when the anti-worm measures are installed in the router, the anti-worm-measure parameter determining apparatus 100 can determine anti-worm-measure parameters according to the same method as the method described in the first embodiment.

Figure 12:
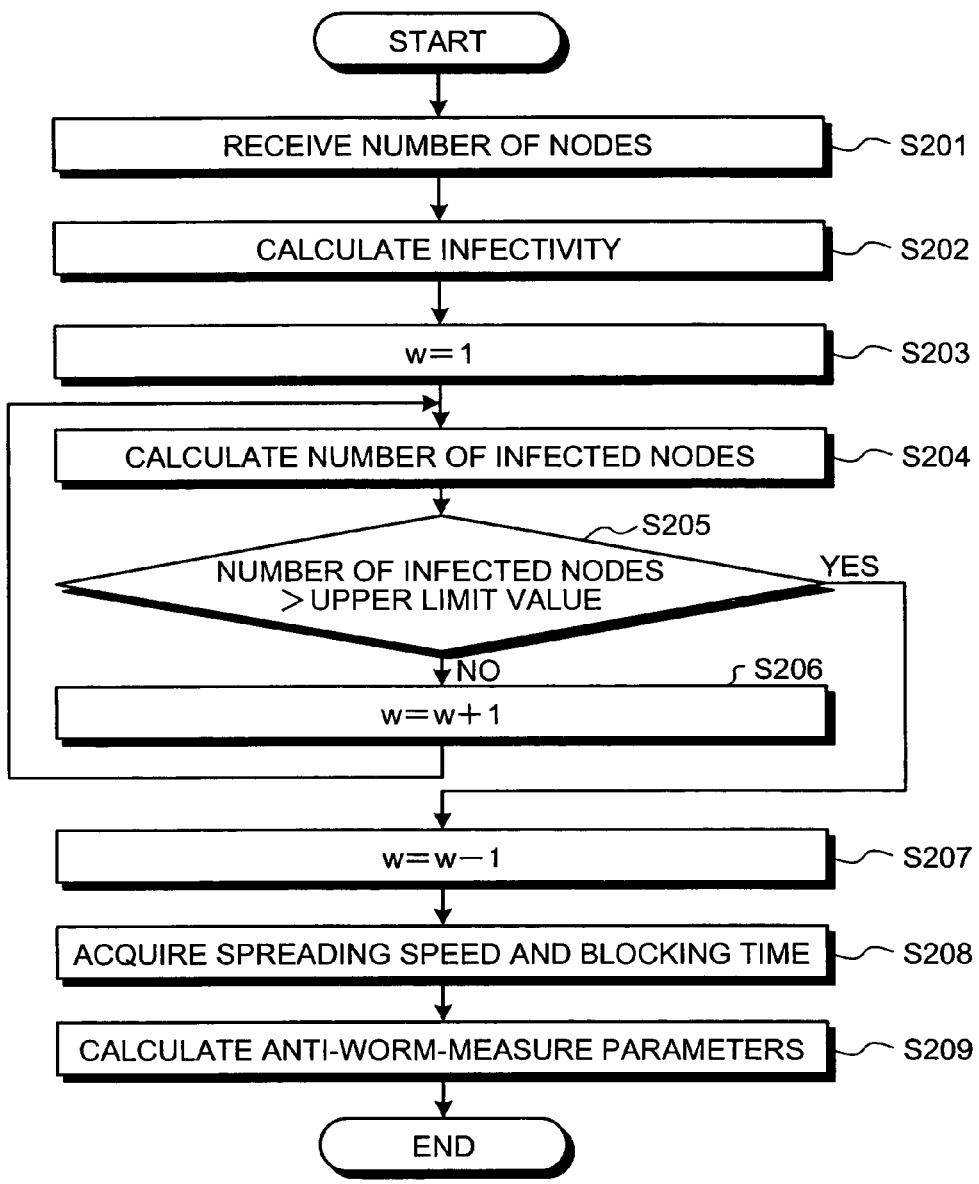
FIG. 12 is a flowchart of a processing procedure of the anti-worm-measure parameter determining apparatus according to the second embodiment.

FIG. 12 is a flowchart of a processing procedure of the anti-worm-measure parameter determining apparatus 100 according to the second embodiment As shown in the figure, the anti-worm-measure parameter determining apparatus 100 receives an input of the number of nodes of a network for which anti-worm-measure parameters are determined (S201). The infectivity calculating unit 111 calculates the infectivity p based on the number of nodes inputted (step S202). In the calculation of the infectivity p, as indicated by Equation (2-2), the number of nodes subordinate to the routers is subtracted from the number of nodes connected to the respective networks to be infected.

Subsequently, the limit-number-of-leaked-packets deriving unit 112 initializes the number of worm packets w of worm packets transmitted from one infected node to 1 (step S203). The limit-number-of-leaked-packets deriving unit 112 designates p and w and causes the number-of-infected-nodes estimating unit 113 to calculate the expected value E of the number of infected nodes for T being sufficiently large (step S204). If the expected value E of the number of infected nodes does not exceed a predetermined upper limit value ("No" at step S205), the limit-number-of-leaked-packets deriving unit 112 adds 1 to w (step S206), returns to step S204, and causes the number-of-infected-nodes estimating unit 113 to calculate the expected value E of the number of infected nodes.

Specifically, the predetermined upper limit value is a value obtained by subtracting 1 corresponding to a network of an infection source from a total number of networks subordinate to the respective routers. It is possible to register the predetermined upper limit value in the anti-worm-measure parameter determining apparatus 100 in advance or input the predetermined upper limit value together with the number of nodes at step S201.

If the expected value E of the number of infected nodes exceeds the predetermined upper limit value ("Yes" at step S205), the limit-number-of-leaked-packets deriving unit 112 sets a value obtained by subtracting 1 from w as the limit number of leaked packets (step S207). The measure-parameter calculating unit 114 acquires spreading speed of a worm and a blocking time of the anti-worm-measure means from the storing unit 120 (step S208) and calculates anti-worm-measure parameters based on these values and the limit number of leaked packets calculated by the limit-number-of-leaked-packets deriving unit 112 (step S209).

As described above, the method of calculating the infectivity p and the method of calculating the limit number of leaked packets w are changed. Consequently, the anti-worm-measure parameter determining apparatus 100 can also calculate anti-worm-measure parameters for the anti-worm-measure means installed in transmission apparatuses such as the routers.

According to the first and the second embodiments, the examples in which anti-worm-measure parameters are calculated with the number of nodes as an input are explained. Conversely, it is also possible to calculate the number of nodes with anti-worm-measure parameters as an input. Thus, according to a third embodiment of the present invention, an example in which the number of nodes is calculated with anti-worm-measure parameters as an input.

Figure 13:
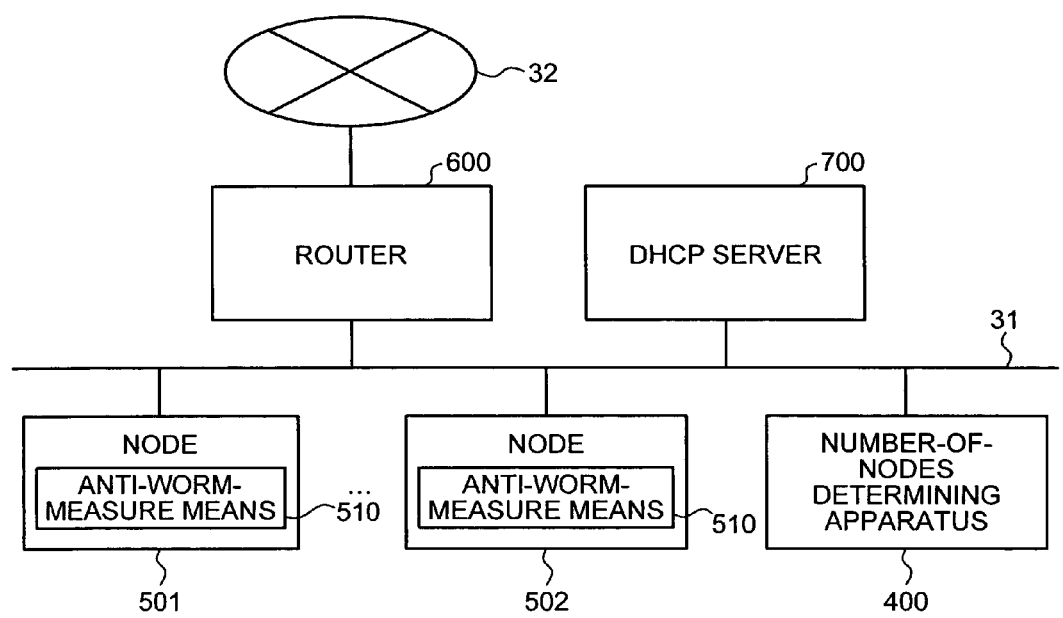
FIG. 13 is a schematic of an example of arranging a number-of-nodes determining apparatus according to a third embodiment of the present invention.

FIG. 13 is a schematic of an example of arranging a number-of-nodes determining apparatus 400 according to the third embodiment.

The number-of-nodes determining apparatus 400 determines the number of nodes, with which it is possible to prevent spread of a worm, with anti-worm-measure parameters as an input by applying the anti-worm-measure parameters. The number-of-nodes determining apparatus 400 is connected to the network 31. Nodes 501 to 502, a router 600 for connecting the network 31 to the network 32, and a dynamic host configuration protocol (DHCP) server 700 that allocates IP addresses to the nodes 501 to 502 are also connected to the network 31.

An anti-worm-measure means 510 such as an anti-worm-measure program or a firewall program, which is means for preventing infection of worms from other nodes to the own nodes and infection of worms from the own nodes to the other nodes, is installed in the nodes 501 to 502. According to the third embodiment, it is assumed that the anti-worm-measure means 510 are installed in all the nodes connected to the networks in the same manner.

In the anti-worm-measure means 510, a blocking limit time s is designated as an anti-worm-measure parameter. This blocking limit time s is a minimum time that is set taking into account performance of the anti-worm-measure means 510 (e.g., a blocking time, that is, time from start of blocking of a worm until completion of the blocking, etc.). It is assumed that the blocking time cannot be set shorter than the blocking limit time s.

To prevent spread of a worm in an environment in which it is impossible to change anti-worm-measure parameters of the anti-worm-measure means 510 in this way, it is necessary to control the number of nodes connected to the network. Thus, the number-of-nodes determining apparatus 400 calculates an upper limit value of the number of nodes, with which it is possible to prevent spread of an unknown worm when a blocking limit time is s, and instructs the DHCP server 700 not to allocate IP addresses exceeding that number.

The number-of-nodes determining apparatus 400 does not always have to be connected to the network 31. The number-of-nodes determining apparatus 400 may calculate the number of nodes off line. It is also possible to install the number-of-nodes determining apparatus 400 or a program having the same function as the number-of-nodes determining apparatus 400 in the router 600 or the DHCP server 700. It is also possible to use means other than the DHCP server 700 to prevent nodes exceeding an upper limit value calculated by the number-of-nodes determining apparatus 400 from being connected to the network.

Figure 14:
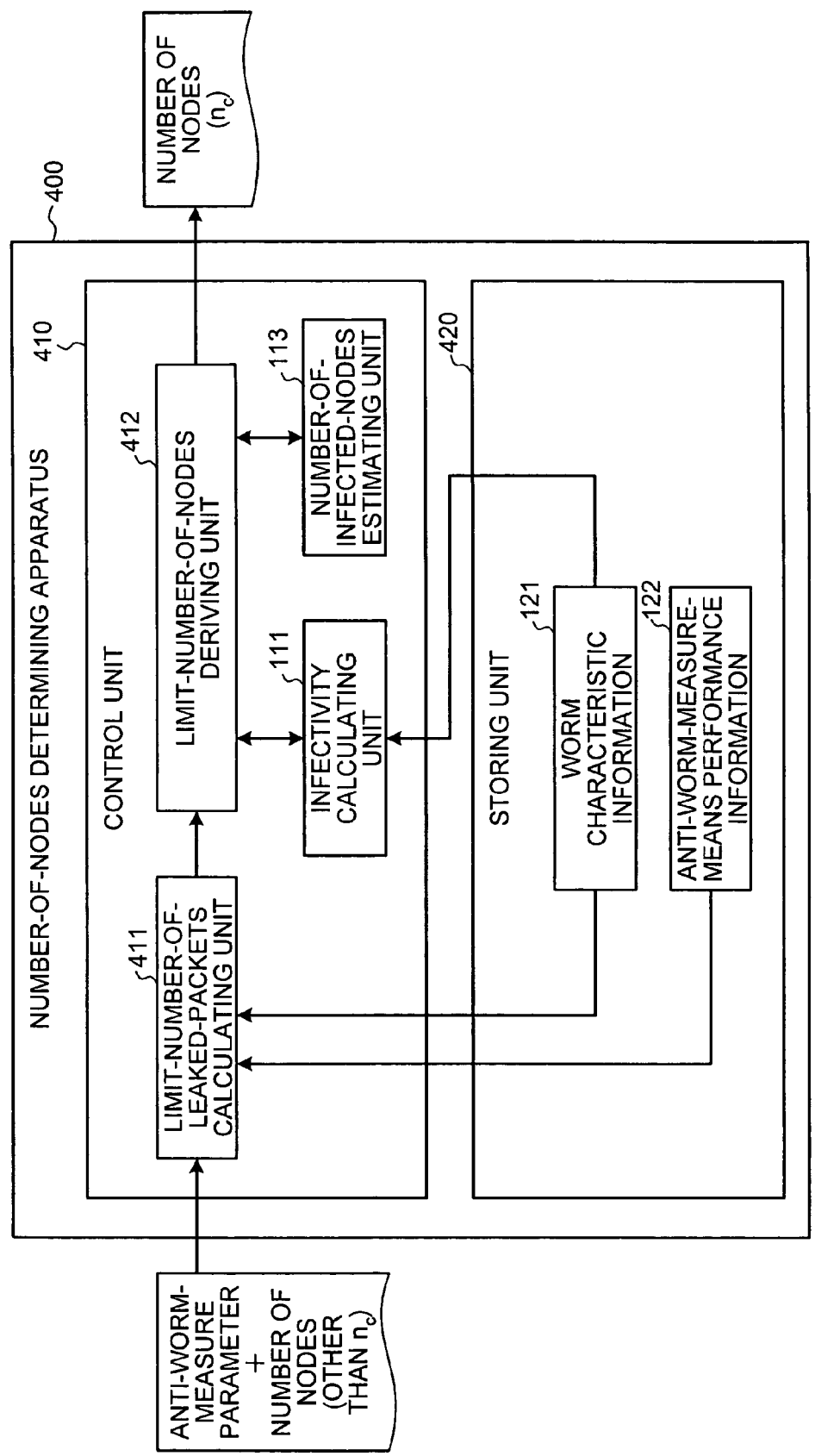
FIG. 14 is a block diagram of the number-of-nodes determining apparatus according to the third embodiment.

FIG. 14 is a block diagram of the number-of-nodes determining apparatus 400 according to the third embodiment. As shown in the figure, the number-of-nodes determining apparatus 400 is an apparatus with anti-worm-measure parameters such as a blocking limit time and the number of nodes other than $n_c$ as an input and with the number of nodes $n_c$ as an output. The number-of-nodes determining apparatus 400 includes a control unit 410 and a storing unit 420.

The control unit 410 controls the number-of-nodes determining apparatus 400. The control unit 410 includes a limit-number-of-leaked-packets calculating unit 411, a limit-number-of-nodes deriving unit 412, the infectivity calculating unit 111, and the number-of-infected-nodes estimating unit 113. The infectivity calculating unit 111 and the number-of-infected-nodes estimating unit 113 are the same processing units as the infectivity calculating unit 111 and the number-of-infected-nodes estimating unit 113 shown in FIG. 5.

The limit-number-of-leaked-packets calculating unit 411 calculates the limit number of leaked packets based on anti-worm-measure parameters inputted. Specifically, the limit-number-of-leaked packets calculating unit 411 calculates the limit number of leaked packets w based on the number of packets allowed to be leaked until the start of blocking shown in FIG. 3A, the blocking limit time shown in FIG. 3B, and the like.

If spreading speed of a worm is necessary for calculating the limit number of leaked packets w, the limit-number-of-leaked-packets calculating unit 411 acquires information on the spreading speed from the worm characteristic information 121 of the storing unit 420. If a blocking time of anti-worm-measure means is necessary, the limit-number-of-leaked-packets calculating unit 411 acquires information on the blocking time from the anti-worm-measure-means performance information 122 of the storing unit 420.

The limit-number-of-nodes deriving unit 412 derives an upper limit number of $n_c$ for preventing a worm from spreading based on the limit number of leaked packets calculated by the limit-number-of-leaked-packets calculating unit 411 and the number of nodes other than nc inputted.

The limit-number-of-nodes deriving unit 412 designates provisional $n_c$ together with the number of other nodes while sequentially incrementing the provisional $n_c$ by one from 1 and causes the infectivity calculating unit 111 to calculate the infectivity p. The limit-number-of-nodes deriving unit 412 designates the infectivity p calculated by the limit-number-of-nodes deriving unit 412 and the limit number of leaked packets w calculated by the limit-number-of-leaked-packets calculating unit 411 and causes the number-of-infected-nodes estimating unit 133 to calculate an expected value of the number of infected nodes. The limit-number-of-nodes deriving unit 412 sets a value of the provisional $n_c$ immediately before the expected value E changes to ∞ as an upper limit number of $n_c$ for preventing the worm from spreading.

The storing unit 420 stores various kinds of information. The storing unit 420 stores the worm characteristic information 121 and the anti-worm-measure-means performance information 122. The worm characteristic information 121 and the anti-worm-measure-means performance information 122 are the same information as the worm characteristic information 121 and the anti-worm-measure-means-performance information 122 shown in FIG. 5.

The anti-worm-measure parameters and the number of nodes other than $n_c$, which the limit-number-of-leaked-packets calculating unit 411 and the like use for processing, may be inputted by an inputting unit such as a not-shown keyboard, may be inputted through the network, or may be stored in the storing unit 420 in advance.

According to the third embodiment, the example in which the anti-worm-measure parameters and the number of nodes other than $n_c$ are set as an input and the upper limit number of $n_c$ for preventing a worm from spreading is set as an output is explained. However, it is also possible to include $n_c$ in an input and output an upper limit value of $n_a$ or $n_b$ for preventing a worm from spreading.

Figure 15:
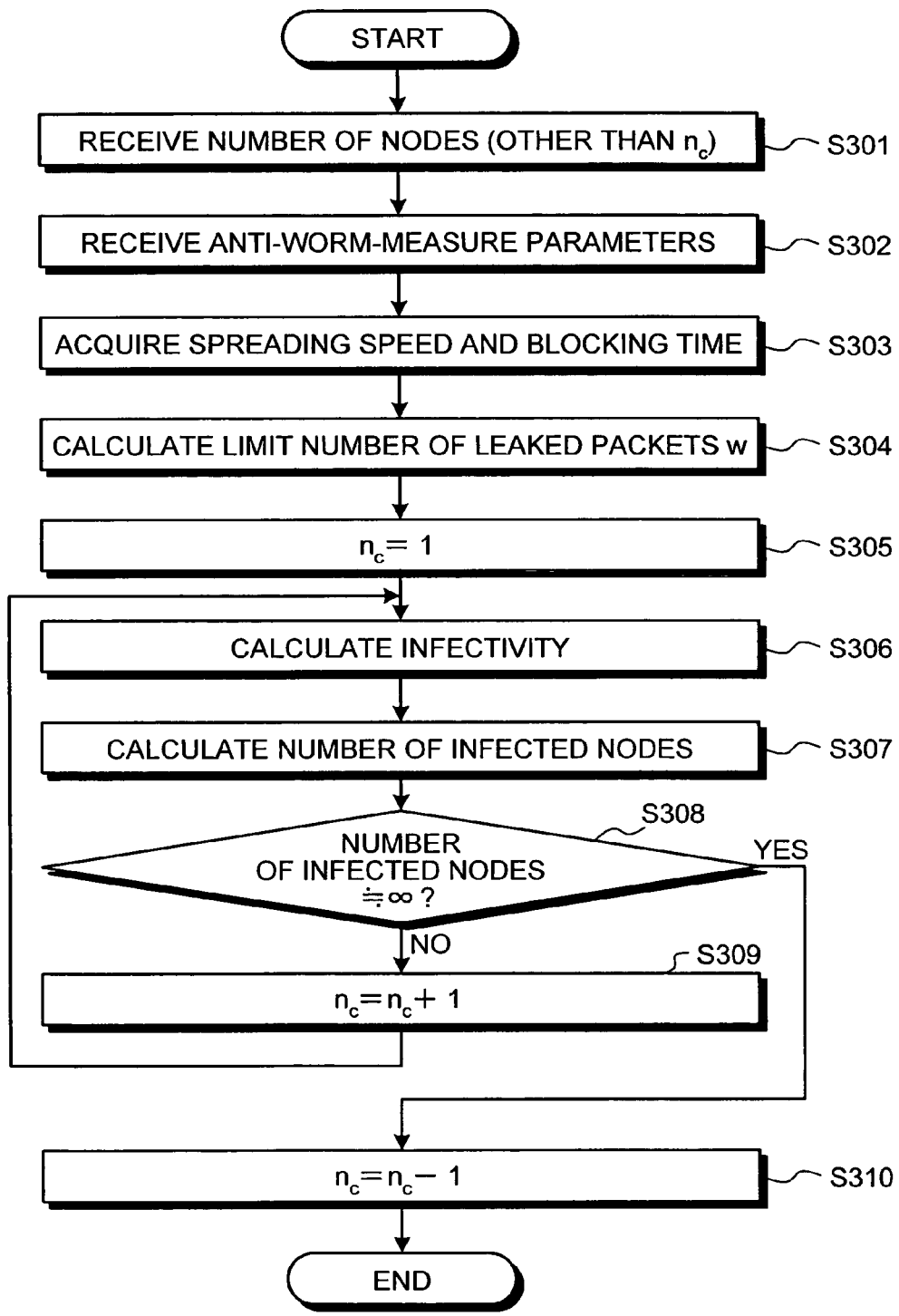
FIG. 15 is a flowchart of a processing procedure of the number-of-nodes determining apparatus according to the third embodiment.

FIG. 15 is a flowchart of a processing procedure of the number-of-nodes determining apparatus 400 according to the third embodiment.

As shown in the figure, the number-of-nodes determining apparatus 400 receives an input of the number of nodes other than $n_c$ (step S301). Moreover, the number-of-nodes determining apparatus 400 receives an input of anti-worm-measure parameters (step S302). The limit-number-of-leaked-packets calculating unit 411 acquires spreading speed of a worm and a blocking time of the anti-worm-measure means from the storing unit 120 (step S303) and calculates the limit number of leaked packets w based on these values and the values inputted (step S304).

Subsequently, the limit-number-of-nodes deriving unit 412 initializes provisional $N_c$ to 1 (step S305). The limit-number-of-nodes deriving unit 412 designates the number of nodes inputted and the provisional $n_c$ and causes the infectivity calculating unit 111 to calculate the infectivity p (step S306). Moreover, the limit-number-of-nodes deriving unit 412 designates the infectivity p and the limit number of leaked packets w calculated and causes the number-of-infected-nodes estimating unit 113 to calculate the expected value E of the number of infected nodes for the time T being sufficiently large (step S307).

Figure 16:
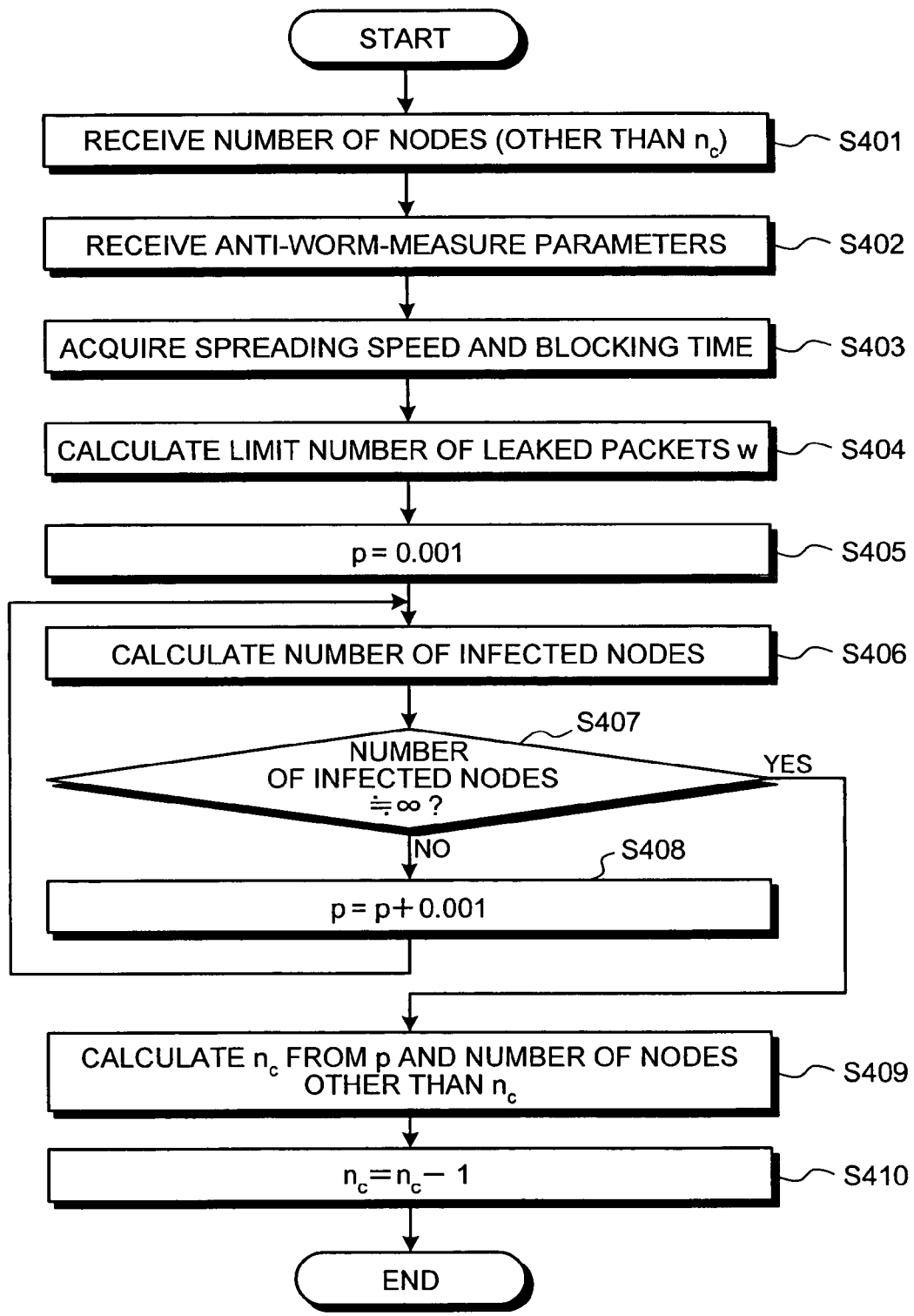
FIG. 16 is a flowchart of another processing procedure of the number-of-nodes determining apparatus according to the third embodiment.

If the expected value E of the number of infected nodes is not ∞ ("No" at step S308), the limit-number-of-nodes deriving unit 412 adds 1 to the provisional $n_c$ (step S309), returns to step S306, and executes the calculation of the infectivity p and the expected value E of the number of infected nodes again. If the expected value E of the number of infected nodes is ∞ ("Yes" at step S308), the limit-number-of-nodes deriving unit 412 sets a value obtained by subtracting 1 from the provisional $n_c$ as an upper limit number of $n_c$ (step S310) It is also possible to set the infectivity p as a provisional value and calculate an upper limit number of $n_c$ instead of setting $n_c$ as a provisional value and calculating an upper limit number of $n_c$. A processing procedure in this case is shown in FIG. 16.

The number-of-nodes determining apparatus 400 receives an input of the number of nodes other than $n_c$ (step S401) Moreover, the number-of-nodes determining apparatus 400 receives an input of anti-worm-measure parameters (step S402). The limit-number-of-leaked-packets calculating unit 411 acquires spreading speed of a worm and a blocking time of the anti-worm-measure means from the storing unit 120 (step S403) and calculates the limit number of leaked packets w based on these values and the values inputted (step S404).

Subsequently, the limit-number-of-nodes deriving unit 412 initializes provisional infectivity p to 0.001 (step S405). The limit-number-of-nodes deriving unit 412 designates the provisional infectivity p and the limit number of leaked packets w and causes the number-of-infected-nodes estimating unit 113 to calculate the expected value E of the number of infected nodes for the time T being sufficiently large (step S406).

If the expected value E of the number of infected nodes is not ∞ ("No" at step S407), the limit-number-of-nodes deriving unit 412 adds 0.001 to the provisional infectivity p (step S408), returns to step S406, and executes the calculation of the number of infected nodes and the expected value E of the number of infected nodes again.

If the expected value E of the number of infected nodes is ∞ ("Yes" at step S407), the limit-number-of-nodes deriving unit 412 designates the provisional infectivity p and the number of nodes other than $n_c$ and causes the infectivity calculating unit 111 to calculate $n_c$ backward (step S409) and sets a value obtained by subtracting 1 from nc calculated as an upper limit number of $n_c$ (step S410)

In the processing procedure described above, the provisional infectivity p is increased by 0.001 at a time. However, an interval of the increase is not limited to this.

It is also possible to realize the functions of the number-of-nodes determining apparatus 400 by executing a number-of-nodes determining program prepared in advance with a computer. A structure of the computer that executes number-of-nodes determination is the same as the computer 1000 shown in FIG. 8.

As described above, according to the third embodiment, an upper limit of the number of nodes, with which a worm does not spread, is calculated based on the setting and the like of the anti-worm-measure apparatus. Thus, even when it is impossible to prevent spread of a worm by changing the setting of the anti-worm-measure apparatus, it is possible to prevent spread of the worm by limiting the number of nodes.

According to an embodiment of the present invention, infectivity of the worm is calculated based on the number of nodes connected by the network and an expected value indicating how many nodes are infected with the worm when the worm transmits how many packets is calculated based on this infectivity. Thus, there is an effect that it is possible to set anti-worm-measure parameters taking into account how many nodes the infection is spread to when how many packets are leaked until blocking of communication by the worm is completed.

Furthermore, according to an embodiment of the present invention, infectivity of the worm is calculated taking into account the logic for selecting an infection destination of the worm. Thus, there is an effect that it is possible to properly calculate the infectivity of the worm.

Moreover, according to an embodiment of the present invention, the number of packets transmitted by the worm that causes the spread of the worm is calculated and anti-worm-measure parameters are set to complete blocking before the worm transmits the number of packets. Thus, there is an effect that it is possible to set the anti-worm-measure parameters taking into account a limit of prevention of the spread of the worm.

Furthermore, according to an embodiment of the present invention, the anti-worm-measure means sets the number of packets allowed to be leaked taking into account the limit of prevention of the spread of the worm. Thus, there is an effect that it is possible to set anti-worm-measure parameters to prevent the worm from being spread.

Moreover, according to an embodiment of the present invention, the anti-worm-measure means sets time until blocking of communication by the worm taking into account the limit of prevention of the spread of the worm. Thus, there is an effect that it is possible to set anti-worm-measure parameters to prevent the worm from being spread.

Furthermore, according to an embodiment of the present invention, the anti-worm-measure means sets the number of packets allowed to be leaked considering that the infection of the worm does not spread exceeding the predetermined upper limit number. Thus, there is an effect that, even when it is impossible to prevent the spread if the, infection of the worm spreads exceeding the predetermined upper limit number, it is possible to set anti-worm-measure parameters to prevent the worm from being spread.

Moreover, according to an embodiment of the present invention, the upper limit of the number of nodes to which the worm does not spread is calculated based on the setting and the like of the anti-worm-measure apparatus. Thus, there is an effect that, even when it is impossible to prevent the spread of the worm by changing the setting of the anti-worm-measure apparatus, it is possible to prevent the spread of the worm by limiting the number of nodes.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program for determining parameters for controlling timing for an anti-worm-measure means to start blocking of a communication by a worm in a network, for preventing a spread of the worm, wherein the computer program causes a computer to execute a process comprising:
    calculating infectivity of the worm based on the number of nodes connected to the network;
    estimating expected values of the number of infected nodes based on the number of packets transmitted by the worm and the infectivity calculated at the calculating step; and
    deriving the number of packets from a finite maximum value among the expected values estimated at the estimating step, as an upper limit of the number of packets allowed to be leaked from one infected node.

2. The non-transitory computer-readable recording medium according to claim 1, wherein the calculating step includes calculating the infectivity of the worm based on a probability that the worm selects, as an infection destination, one node out of a group of nodes having a network address of a predetermined pattern with a network address of a node infected by the worm as a reference and the number of nodes having the network address of the predetermined pattern.

3. The non-transitory computer-readable recording medium according to claim 1, wherein the computer program further causes the computer to execute:
    calculating, based on the number of packets derived at the deriving step and the number of packets leaked during a time from when the anti-worm-measure means starts the blocking of the communication by the worm until the anti-worm-measure means completes the blocking of the communication by the worm, an upper limit of the number of packets allowed to be leaked until the anti-worm-measure means starts the blocking of the communication by the worm after the worm is firstly detected.

4. The non-transitory computer-readable recording medium according to claim 1, wherein the computer program further causes the computer to execute:
    calculating, based on the number of packets derived at the deriving step and a spreading speed of the worm, an upper limit of the permitted interval time until completely blocking the worm on the anti-worm-measure unit from detection of the worm.

5. The non-transitory computer-readable recording medium according to claim 1, wherein the calculating includes calculating the infectivity of the worm based on the number of nodes obtained by multiplying the number of nodes connected to the network by a ratio of nodes without a measure for preventing infection of the worm.

6. A non-transitory computer-readable recording medium that stores therein a computer program for determining parameters for controlling timing for an anti-worm-measure means to start blocking of a communication by a worm in a network, for preventing a spread of the worm, wherein the computer program causes a computer to execute a process comprising:
    calculating infectivity of the worm based on the number of nodes connected to the network;
    estimating expected values of the number of infected nodes based on the calculating step number of packets transmitted by the worm and the infectivity calculated at the; and
    deriving the number of packets from a value among the expected values estimated at the estimating step, as an upper limit of the number of packets allowed to be leaked from one infected node, the value being below a predetermined upper-limit value.

7. The non-transitory computer-readable recording medium according to claim 6, wherein the computer program further causes the computer to execute:
    calculating, based on the number of packets derived at the deriving step and the number of packets leaked during a time from when the anti-worm-measure means starts the blocking of the communication by the worm until the anti-worm-measure means completes the blocking of the communication by the worm, an upper limit of the number of packets allowed to be leaked until the anti-worm-measure means starts the blocking of the communication by the worm after the worm is firstly detected.

8. The non-transitory computer-readable recording medium according to claim 6, wherein the computer program further causes the computer to execute:
    calculating, based on the number of packets derived at the deriving step and spreading speed of the worm, an upper limit of a permitted time interval from the detection of the worm until the anti-worm-measure means completely blocks the worm.

9. The non-transitory computer-readable recording medium according to claim 6, wherein the calculating step includes calculating the infectivity of the worm based on the number of nodes obtained by multiplying the number of nodes connected to the network by a ratio of nodes without a measure for preventing infection of the worm.

10. An anti-worm-measure parameter determining apparatus that determines parameters for controlling timing for an anti-worm-measure to start blocking of a communication by a worm in a network, for preventing a spread of the worm, the anti-worm-measure parameter determining apparatus comprising:
    an infectivity calculating unit that calculates infectivity of the worm based on the number of nodes connected to the network;
    a number-of-infected-nodes estimating unit that estimates expected values of the number of infected nodes, based on the number of packets transmitted by the worm and the infectivity calculated by the infectivity calculating unit; and
    a number-of-leaked-packets deriving unit that derives the number of packets from a finite maximum value among the expected values estimated by the number-of-infected-nodes estimating unit, as an upper limit of the number of packets allowed to be leaked from one infected node.

11. The anti-worm-measure parameter determining apparatus according to claim 10, wherein the infectivity calculating unit calculates the infectivity of the worm based on a probability that the worm selects, as an infection destination, one node out of a group of nodes having a network address of a predetermined pattern with a network address of a node infected by the worm as a reference and the number of nodes having the network address of the predetermined pattern.

12. The anti-worm-measure parameter determining apparatus according to claim 10, further comprising:
    an anti-worm-measure parameter calculating unit that calculates, based on the number of packets derived by the number-of-leaked-packets deriving unit and the number of packets leaked during a time from the anti-worm-measure starting the blocking of the communication by the worm until the anti-worm-measure completes the blocking of the communication by the worm, an upper limit of the number of packets allowed to be leaked until the anti-worm-measure starts the blocking of the communication by the worm after the worm is firstly detected.

13. The anti-worm-measure parameter determining apparatus according to claim 10, further comprising:
an anti-worm-measure parameter calculating unit that calculates, based on the number of packets derived by the number-of-leaked-packets deriving unit and a spreading speed of the worm, an upper limit of the permitted interval time until completely blocking the worm on the anti-worm-measure unit from detection of the worm.

14. The anti-worm-measure-parameters determining apparatus according to claim 10, wherein the infectivity calculating unit calculates the infectivity of the worm based on the number of nodes obtained by multiplying the number of nodes connected to the network by a ratio of nodes without a measure for preventing infection of the worm.

15. An anti-worm-measure parameter determining apparatus that determines parameters for controlling timing for an anti-worm-measure to start blocking of a communication by a worm in a network, for preventing a spread of the worm, the anti-worm-measure parameter determining apparatus comprising:
an infectivity calculating unit that calculates infectivity of the worm based on the number of nodes connected to the network;
a number-of-infected-nodes estimating unit that estimates expected values of the number of infected nodes, based on the number of packets transmitted by the worm and the infectivity calculated by the infectivity calculating unit; and
a number-of-leaked-packets deriving unit that derives the number of packets from a value among the expected values estimated by the number-of-infected-nodes estimating unit, as an upper limit of the number of packets allowed to be leaked from one infected node, the value being below a predetermined upper-limit value.

16. The anti-worm-measure parameter determining apparatus according to claim 15, further comprising:
an anti-worm-measure parameter calculating unit that calculates, based on the number of packets derived by the number-of-leaked-packets deriving unit and the number of packets leaked during a time from the anti-worm-measure starting the blocking of the communication by the worm until the anti-worm-measure completes the blocking of the communication by the worm, an upper limit of number of packets allowed to be leaked until the anti-worm-measure starts the blocking of the communication by the worm after the worm is firstly detected.

17. The anti-worm-measure parameter determining apparatus according to claim 15, further comprising:
an anti-worm-measure parameter calculating unit that calculates, based on the number of packets derived at the deriving step and a spreading speed of the worm, an upper limit of a permitted time interval from the detection of the worm until the anti-worm-measure completely blocks the worm.

18. The anti-worm-measure-parameters determining apparatus according to claim 15, wherein the infectivity calculating unit calculates the infectivity of the worm based on the number of nodes obtained by multiplying the number of nodes connected to the network by a ratio of nodes without a measure for preventing infection of the worm.

* * * * *

UNITED STATES PATENT AND TRADEMARK OFFICE
CERTIFICATE OF CORRECTION

| | | |
|---|---|---|
| PATENT NO. | : 7,926,110 B2 | Page 1 of 1 |
| APPLICATION NO. | : 11/485807 | |
| DATED | : April 12, 2011 | |
| INVENTOR(S) | : Omote et al. | |

It is certified that error appears in the above-identified patent and that said Letters Patent is hereby corrected as shown below:

In the Claims:

Col. 19, Lines 61-64   Delete the third paragraph of claim 6 and insert in its place:
Claim 6

--estimating expected values of the number of infected nodes based on the number of packets transmitted by the worm and the infectivity calculated at the calculating step; and--

Signed and Sealed this
Thirtieth Day of August, 2011

David J. Kappos
*Director of the United States Patent and Trademark Office*